United States Patent [19]
Isaji et al.

[11] Patent Number: 5,641,016
[45] Date of Patent: Jun. 24, 1997

[54] AIR-CONDITIONING APPARATUS FOR VEHICLE USE

[75] Inventors: Akira Isaji, Nishio; Naoto Hotta, Aichi-gun; Yasuo Kondo, Okazaki; Yuji Takeo, Toyoake; Shizuo Tsuchiya, Gifu, all of Japan

[73] Assignee: Nippondenso Co., Ltd., Kariya, Japan

[21] Appl. No.: 364,253

[22] Filed: Dec. 27, 1994

[30] Foreign Application Priority Data

| Dec. 27, 1993 | [JP] | Japan | 5-333525 |
| Apr. 14, 1994 | [JP] | Japan | 6-075541 |
| Jul. 22, 1994 | [JP] | Japan | 6-171223 |

[51] Int. Cl.$^6$ ................................. B60H 3/00
[52] U.S. Cl. ......................... 165/43; 62/238.6
[58] Field of Search ............... 165/42, 43; 62/238.6, 62/244

[56] References Cited

U.S. PATENT DOCUMENTS

| 4,254,630 | 3/1981 | Geary | 62/238.6 |
| 4,399,664 | 8/1983 | Derosier | 62/238.6 |
| 4,492,091 | 1/1985 | Whitwell et al. | 62/238.6 |
| 4,646,537 | 3/1987 | Crawford | 62/238.6 |
| 5,421,169 | 6/1995 | Benedict | 165/42 |
| 5,435,150 | 7/1995 | Khelifa et al. | 165/42 |
| 5,483,807 | 1/1996 | Abersfelder et al. | 165/43 |
| 5,497,941 | 3/1996 | Numazawa et al. | 165/43 |
| 5,501,267 | 3/1996 | Iritani et al. | 165/42 |
| 5,524,446 | 6/1996 | Hotta et al. | 165/43 |

FOREIGN PATENT DOCUMENTS

| 4209188 | 9/1993 | Germany | 165/41 |
| 4151324 | 5/1992 | Japan . | |

*Primary Examiner*—Edward K. Look
*Assistant Examiner*—Mark Sgantzos
*Attorney, Agent, or Firm*—Cushman, Darby & Cushman IP Group of Pillsbury Madison & Sutro LLP

[57] ABSTRACT

An air-conditioning apparatus for vehicle use which can obtain sufficient heater capacity even in a cold-climate region, can utilize an existing heater unit, can combine a combustion type heater with a simple assembly operation, and can utilize exhaust heat of a motor for travel use of an automobile for heating a passenger compartment. The air-conditioning apparatus includes a refrigeration cycle connecting a refrigerant compressor, a refrigerant/water heat exchanger, a first pressure-reducer, and an exterior heat exchanger in an annular configuration. Further, a hot-water cycle connects the refrigerant/water heat exchanger, a hot-water heater core, an exhaust-heat cooler, and a water pump in an annular configuration and connects a combustion type heater in parallel with the refrigerant/water heat exchanger. Accordingly, during heat-pump hot-water heating, hot water, with a temperature raised by refrigerant condensation by the refrigerant/water heat exchanger, circulates in the hot-water heater core so as to obtain a required heater capacity. During combustion heater hot-water heating, hot water, with a temperature raised by combustion fuel in the combustion type heater, circulates in the hot-water heater core so as to obtain sufficient heating capacity even in a cold-climate region.

23 Claims, 25 Drawing Sheets

FIG. 26

AIR-CONDITIONING APPARATUS FOR VEHICLE USE

CROSS REFERENCE TO RELATED APPLICATIONS

This application is based upon and claims priority from Japanese Patent Applications 5-333525 filed Dec. 27, 1993, 6-75541 filed Apr. 14, 1994, and 6-171223 filed Jul. 22, 1994, the contents of each being incorporated herein by reference.

BACKGROUND OF THE INVENTION

1. Field of the Invention

The present invention relates to an air-conditioning apparatus for vehicle use, which conditions air within a passenger compartment of, for example, an electric automobile not having engine coolant water nor equipped with an air-cooled type internal combustion engine or the like.

2. Related Art

Japanese Patent Application Laid-open No. 4-151324 discloses an air-conditioning apparatus for vehicle use in which a passenger compartment cannot use a heater that relies upon exhaust heat from engine coolant water, as, for example, is true in the case of electric automobiles. This document teaches a first heat exchanger and a second heat exchanger installed in a refrigeration cycle within a duct for sending air to a passenger compartment of an electric automobile. Furthermore, this document switches the direction of refrigerant flow within the refrigeration cycle by means of valves or the like so as to cause each heat exchanger to function as an evaporator during a cooling mode and as a condenser during a heat pump heater mode.

However, because this document teaches using a structure whereby first and second heat exchangers of a refrigeration cycle are disposed within a duct, an existing heater unit provided with a conventional hot-water heater core could not be used. For this reason, it is necessary to provide an air-conditioning unit provided with first and second heat exchangers, thus leading to the problem of high cost of the system.

Additionally, according to known technology, water capacity declines extremely when ambient air temperature drops to 0° C. or less during the heat pump heater mode, which causes the first and second heat exchangers within the duct to function as condensers. Particularly in a cold-climate region (a region where the ambient air temperature drops to −10° C. to −30° C. or less), with such a heat pump heater, the problem existed that the heater had insufficient capacity. Accordingly, because a heat pump heater has a diminished capacity in a cold-climate region, performing hot-water heating utilizing a combustion type heater as a heat source for heater use in cold-climate regions may be considered.

However, according to the document noted above, because a hot-water cycle provided with hot-water heater devices of a hot-water heater core, water pump, hot-water piping, and the like is not mounted in an electric automobile, a hot-water heater device must be added in order to function as a combustion type heater, and assembling such a fixture within an air-conditioning unit posed problems of extreme difficulty and resulting high cost.

Moreover, even if the cooling of vehicle-mounted electrical devices of, for example, a motor for travel use, an inverter for travel use, etc., of an electric automobile is performed with water cooling, the exhaust heat of this vehicle-mounted electrical device is not employed for heating the air within the passenger Compartment, and so energy is not effectively and sufficiently utilized when the overall energy consumption and utilization of the vehicle is considered.

SUMMARY OF THE INVENTION

It is an object of the present invention to provide an air-conditioning apparatus for vehicle use which can obtain sufficient heater capacity and can also utilize an existing heater unit. Additionally, it is a further object of the present invention to provide an air-conditioning apparatus for vehicle use which can obtain sufficient heater capacity even in a cold-climate region and can also combine a combustion type heater with an extremely simple assembly operation. Moreover, yet another object of the present invention is to provide an air-conditioning apparatus for vehicle use which has improved heater performance and can also effectively utilize exhaust heat from vehicle-mounted electrical devices of a motor for the travel use, inverter for travel use, etc. for heating the passenger compartment.

The invention comprises a duct for sending air toward a passenger compartment interior, a blower to blow air within the duct into the passenger compartment interior, a refrigeration cycle having a refrigerant compressor to compress and discharge refrigerant, a refrigerant/water heat exchanger to cause refrigerant discharged from this refrigerant compressor and hot water to exchange heat and heat the hot water, a refrigerant evaporator to chill air by means of refrigerant evaporation heat, a hot-water cycle having a pump to circulate hot water heated by the refrigerant/water heat exchanger, and a hot-water type heater disposed within the duct to heat air flowing within the duct by means of hot water flowing in from the refrigerant/water heat exchanger.

In a further embodiment of the present invention, the hot-water cycle connects a combustion type heater, which heats hot water by means of combustion heat of fuel, in series with the hot-water type heater.

In still another embodiment, the hot-water cycle connects an exhaust-heat cooler which cools, by means of hot water, vehicle-mounted electrical devices, such as a motor for travel use and inverter for travel use, which generate heat when electrically charged, in series with the hot-water type heat exchanger.

It is also possible to connect an exterior heat exchanger disposed in the duct in series on a downstream side of refrigerant flow from the refrigeration compressor, and it is also possible to connect a radiator which causes heat exchange between air outside a passenger compartment and hot water to cool hot water in series with an exhaust-heat cooler which cools, by means of hot water, vehicle-mounted electrical devices.

Moreover, it is also possible to connect a pressure-reducing means between the refrigerant/water heat exchanger and the exterior heat exchanger. Further, it is possible to connect an electrical hot-water heater which heats hot water by means of an electrical heater in series with the hot-water type heater. Also, the refrigerant evaporator may be disposed on an upwind side of the hot-water type heater within the duct.

A rotational speed control means, which controls rotational speed of the refrigerant compressor to perform capacity control, may be provided. Further, a bypass passage which causes hot water to bypass the radiator may be used. The hot-water type heater may include an air-mix damper to change the amount of heated air caused to be bypassed.

The refrigeration cycle can include an exterior heat exchanger disposed outside the duct and connected in series on a downstream side of refrigerant flow from the refrigeration compressor. A pressure-reducing means may be connected between the refrigerant/water heat exchanger and the exterior heat exchanger. The hot-water cycle may be provided with a combustion type heater which heats hot water by means of combustion heat of fuel, connected in series with the hot-water type heater. A heat-pump hot-water heater and a combustion-heater hot-water heater can be selectively used according to the combustion type heater on the basis of temperature of air outside a passenger compartment.

A water-cooled type internal combustion engine having a water-cooling portion within which water circulates and which rotates and drives an electrical generator may be used. The refrigerant compressor may be an electromotive type refrigerant compressor which receives a supply of electrical power from the electrical generator for operation. The internal combustion engine water-cooling portion can be connected in series on a downstream side of water flow from the refrigerant/water heat exchanger.

A water-cooled type internal combustion engine having a water-cooling portion within which water circulates and which rotates and drives the refrigerant compressor may be provided. The internal combustion engine water-cooling portion may be connected in series on a downstream side of water flow from the refrigerant/water heat exchanger. Accordingly, a refrigerant compressor can be employed as an electromotive type refrigerant compressor controlled by means of an inverter as a drive power supply. The hot-water type heater may be connected in series with an exhaust-heat cooler which cools the inverter by means of hot water. Structural parts including at least the refrigerant compressor and the refrigerant/water heat exchanger may be housed within an integral casing.

The combustion type heater can be connected in series on a downstream side of hot-water flow from the refrigerant/water heat exchanger, and moreover connect it in series on an upstream side of hot-water flow from the hot-water type heater, together with operating it simultaneously with the refrigerant compressor. The exterior heat exchanger may function as a condenser to condense refrigerant during cooler operation and may function as an evaporator to evaporate refrigerant during heater operation. Refrigerant flow may be forced to flow within the exterior heat exchanger and have its flow direction reversed during cooler operation and during heater operation.

According to the present invention, a refrigerant compressor compresses refrigerant and discharges high-temperature, high-pressure refrigerant. Accordingly, the high-temperature, high-pressure refrigerant flowing into a refrigerant/water heat exchanger exchanges heat with hot water circulating through a hot-water cycle and heats the hot water by means of condensation heat. Hot water heated by means of this refrigerant condensation heat is sent by means of a pump to a hot-water type heat exchanger within a duct. Accordingly, hot water flowing into the hot-water type heat exchanger exchanges heat with air flowing within the duct by means of operation of a blower and heats the air. Accordingly, air heated by means of hot water at this hot-water type heat exchanger is blown into a passenger compartment by means of operation of the blower. By means of this, the passenger compartment is heated by means of a heat-pump hot-water heater. Additionally, because an existing heater unit provided with a hot-water type heater can be utilized, lower cost can be obtained.

BRIEF DESCRIPTION OF THE DRAWINGS

These and other objects, features and characteristics of the present invention will be understood by studying the following detailed description, the attached drawings, and appended claims, all of which form a part of this application. In the drawings:

FIG. 26 is a structural view showing a twelfth embodiment of the present invention.

DETAILED DESCRIPTION OF THE PRESENTLY PREFERRED EXEMPLARY EMBODIMENTS

The term "hot water" used in this specification also includes warm water.

[The First Embodiment]

An air-conditioning apparatus for vehicle use according to the present invention will be described on the basis of a plurality of embodiments applied in an air-conditioning apparatus for electric automobile use.

Figure 1:
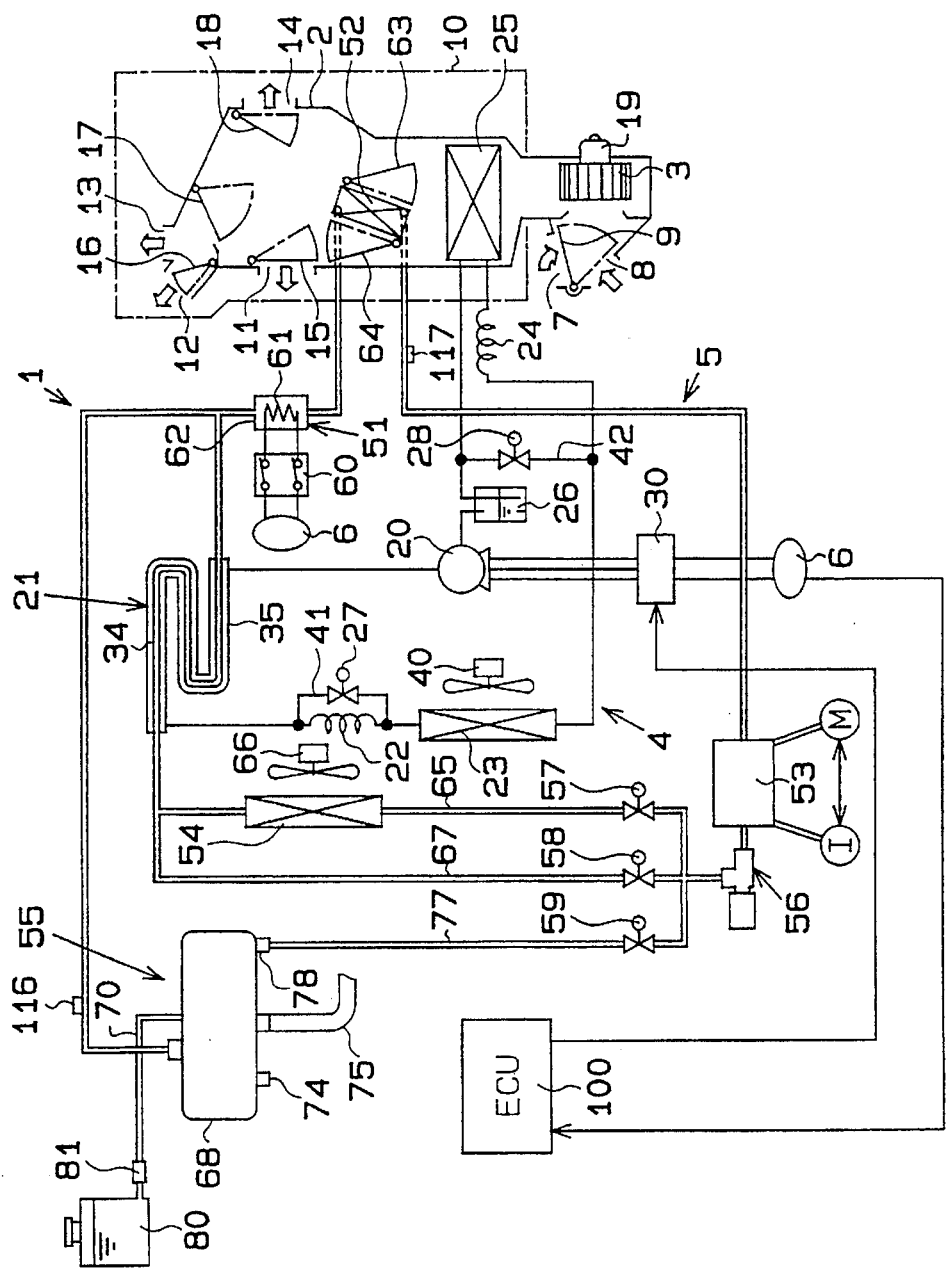
FIG. 1 is a structural diagram showing a first embodiment according to the present invention.
Figure 2:
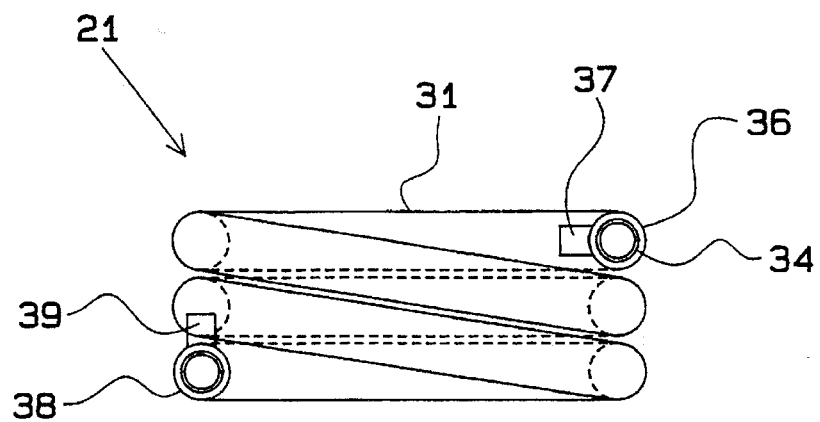
FIG. 2 is a front view showing an example of refrigerant/water heat exchanger according to the first embodiment of the present invention.
Figure 3:
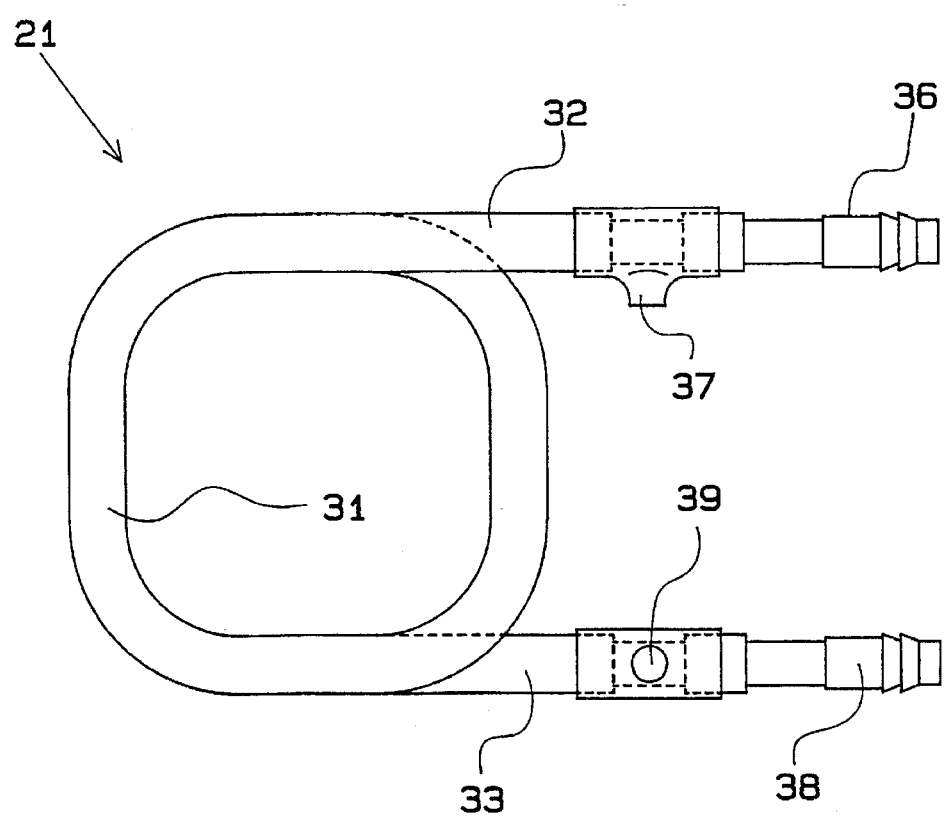
FIG. 3 is a plan view showing an example of refrigerant/water heat exchanger according to the first embodiment of the present invention.
Figure 4:
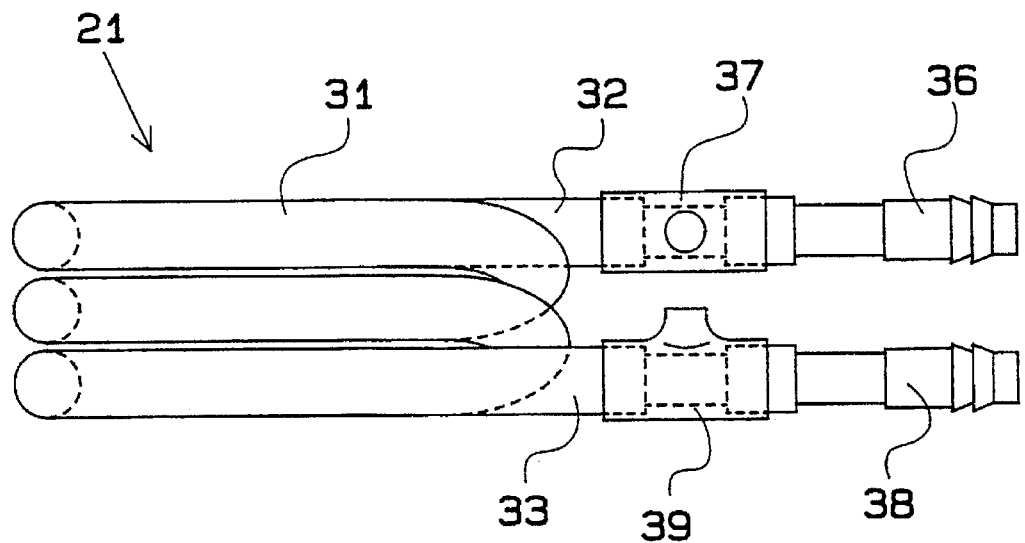
FIG. 4 is a side view showing an example of refrigerant/water heat exchanger according to the first embodiment of the present invention.
Figure 5:
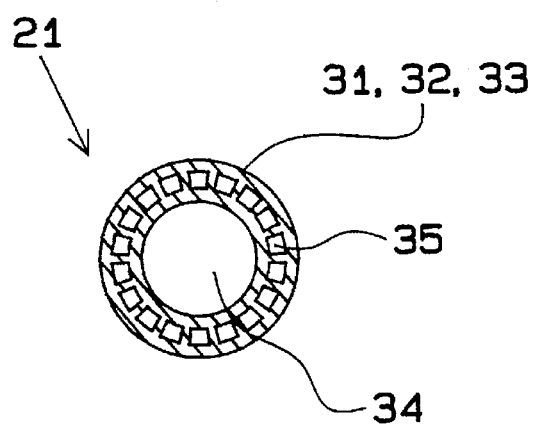
FIG. 5 is a sectional view showing an example of refrigerant/water heat exchanger according to the first embodiment of the present invention.

FIGS. 1 to 12 illustrate the first embodiment according to the present invention. FIG. 1 indicates an air-conditioning apparatus for electric automobile use. Air-conditioning apparatus for electric automobile use 1 is utilized as a so-called manual air conditioner for electric automobile use or an automatic air conditioner for electric automobile use.

Air-conditioning apparatus for electric automobile use 1 is structured with duct 2 for sending air into a passenger compartment, blower 3 which causes airflow to be generated within duct 2, refrigeration cycle (heat-pump cycle) 4 in which refrigerant circulates, hot-water cycle 5 in which hot water circulates, and electronic control unit (hereinafter termed "ECU") 100, which operates by means of electrical power from vehicle-mounted power supply (battery) 6 and controls the respective air-conditioning devices.

Duct 2 is disposed to the forward side of a passenger compartment of an electric automobile. The most upwind side of duct 2 is a portion structuring an inner/outer air switching box, and has inner air intake port 7 and outer air intake port 8. Furthermore, inner/outer air switching damper 9 is installed freely rotatable on an inner side of inner air intake port 7 and outer air intake port 8. Inner/outer air switching damper 9 is driven by means of an actuator (not illustrated) which is a servomotor or the like. A damper is also called a door. It is all right to replace a damper with a door.

Additionally, DEF vent 11, CENTER FACE vent 12, SIDE FACE vent 13, and FOOT vent 14 are disposed on the passenger compartment unit 10 side of duct 2. Furthermore, mode switching dampers 15 to 18 are installed freely rotatable on the inner side of the respective vents. Mode switching dampers 15 to 18 are respectively driven by means of an actuator (not illustrated) which is a servomotor or the like.

Blower 3 is disposed within a scroll casing constituting the upwind side of duct 2. Blower 3 is such that the rotational speed thereof is controlled by means of blower motor 19, and takes in air inside the passenger compartment (hereinafter termed "inner air") or air outside the passenger compartment or (hereinafter termed "outer air") from an opened vent being either inner air intake port 7 or outer air intake port 8, and blows air into the passenger compartment.

Refrigeration cycle 4 is a so-called accumulator cycle, and is structured from refrigerant compressor 20, refrigerant/water heat exchanger 21, first pressure-reducing means 22, exterior heat exchanger 23, second pressure-reducing means 24, refrigerant evaporator 25, accumulator 26, refrigerant passage switching valves 27 and 28, and refrigerant piping and the like to connect these elements.

Refrigeration compressor 20 is an electromotive type refrigerant compressor, and comprises a compressor portion which compresses gas refrigerant flowing into the interior from an intake port and discharges high-temperature, high-pressure gas refrigerant from a discharge port, and an electric motor (not illustrated) as a drive portion to drive this compressor portion. Refrigerant compressor 20 is provided with inverter for air conditioner use 30 as a rotational speed control means to control the rotational speed of refrigerant compressor 20 on the basis of output signals of ECU 100. Accordingly, for the electric motor, electrical power applied from the vehicle-mounted power supply 6 is variably controlled continuously or in a stepwise manner by means of inverter for air conditioner use 30. Consequently, refrigerant compressor 20 controls the heating capacity of refrigerant/water heat exchanger 21 and the cooling capacity of refrigerant evaporator 25 by means of varying the refrigerant discharge capacity and regulating the flow of refrigerant circulating within refrigeration cycle 4 by means of changes in the rotational speed of the electric motor due to changes in applied electrical power.

FIGS. 2 to 5 illustrate examples of a refrigerant/water heat exchanger. Refrigerant/water heat exchanger 21 is a heat exchanger which causes high-temperature, high-pressure gas refrigerant discharged from a discharge port of refrigerant compressor 20 and hot water circulating within hot-water cycle 5 to exchange heat. Refrigerant/water heat exchanger 21 includes a metal of aluminum alloy or the like, and is composed of circular pipe portion 31 of a double-loop configuration and two square pipe portions 32 and 33, with hot-water path 34 formed on the inner side and refrigerant path 35 formed on the outer side. Hot-water inlet pipe 36 and refrigerant outlet pipe 37 are installed on square pipe portion 32. Additionally, hot-water outlet pipe 38 and refrigerant inlet pipe 39 are installed on square pipe portion 33.

First pressure-reducing means 22 is composed of a capillary tube, orifice, expansion valve, and the like, and refrigerant flows through the interior during the heat-pump hot-water heater mode. First pressure-reducing means 22 reduces the pressure of refrigerant flowing through the interior and makes it into refrigerant of a vapor-liquid two-phase state.

Exterior heat exchanger 23 is disposed outside the passenger compartment, for example, in a location which easily receives travel wind of the electric automobile. Exterior heat exchanger 23 functions as an evaporator which causes low-temperature, low-pressure refrigerant in a vapor-liquid two-phase state, which has undergone pressure reduction by first pressure-reducing means 22 during the heat-pump hot-water heater mode, and outer air blown by electric fan 40 to exchange heat, thus causing the refrigerant to evaporate. Additionally, exterior heat exchanger 23 functions as a condenser which causes high-pressure refrigerant which has flowed in from refrigerant/water heat exchanger 21 during the cooler mode and outer air blown by electric fan 40 to exchange heat, thus causing the refrigerant to condense.

Second pressure-reducing means 24 is composed of a capillary tube, orifice, expansion valve, and the like, and refrigerant flows through the interior during the cooler mode. Second pressure-reducing means 24 reduces the pressure of refrigerant flowing through the interior and makes it into refrigerant of a vapor-liquid two-phase state.

Refrigerant evaporator 25 is disposed within a cooling unit case forming an intermediate portion of duct 2. Refrigerant evaporator 25 causes low-temperature, low-pressure refrigerant in a vapor-liquid two-phase state, which has undergone pressure reduction by second pressure-reducing means 24 during the cooler mode, and air passing through by means of operation of blower 3 to exchange heat and cool the air together with causing the refrigerant to evaporate.

Accumulator 26 functions as a vapor-liquid separator which separates refrigerant flowing into the interior into liquid refrigerant and gas refrigerant and supplies only gas refrigerant to refrigerant compressor 20. In addition, it is also acceptable to use a receiver as a vapor-liquid separator. The receiver may also be disposed so as to be connected between refrigerant/water heat exchanger 21 and first pressure-reducing means 22, or to be connected between exterior heat exchanger 23 and second pressure-reducing means 24.

Refrigerant passage switching valves 27 and 28 are electromagnetic type refrigerant passage switching means for switching the direction of refrigerant flow within refrigeration cycle 4. Refrigerant passage switching valves 27 and 28 are provided respectively with bypass pipelines 41 and 42, which cause refrigerant to bypass first and second pressure-reducing means 22 and 24. Refrigerant passage switching valves 27 and 28 are opened when electrically charged and closed when the electrical charging is stopped.

Hot-water cycle 5 is structured from refrigerant/water heat exchanger 21, electric hot-water heater 51, hot-water heater core 52, exhaust-heat cooler 53, radiator 54, combustion type heater 55, water pump 56, hot-water passage switching valves 57 to 59, and hot-water cycle piping and the like to connect these elements. According to the present embodiment, antifreeze (for example a water-based solution of ethylene glycol) is utilized as hot water.

Electric hot-water heater 51 is composed of hot-water tank 62 in the interior of which is disposed electric heater 61, the electrical charge of which is controlled by means of heater controller 60, and hot water is heated by means of heat generation of electric heater 61.

Hot-water heater core 52 is a hot-water type heater according to the present invention, and is disposed within duct 2 on the downwind side from refrigerant evaporator 25. That is, hot-water heater core 52 is disposed within a heater unit case forming a vent switching box of duct 2. Hot-water heater core 52 causes hot water heated to high temperature and air flowing within duct 2 to exchange heat, and thus heats the air.

Air-mix dampers 63 and 64 regulate the amount of air passing through hot-water heater core 52 and the amount of air bypassing hot-water heater core 52 and adjust the temperature of blown air which is blown into the passenger compartment. Dampers 63 and 64 are freely and rotatably installed in the air inlet portion and outlet portion of hot-water heater core 52. Air-mix dampers 63 and 64 are driven respectively by means of an actuator (not illustrated) which is a stepping motor, servomotor, or the like.

Exhaust-heat cooler 53 is provided with a water jacket (not illustrated) and a hot-water chamber (not illustrated) into which hot water flows. Exhaust-heat cooler 53 cools, by means of the hot water, motor for travel use M and electrical components such as transistors within inverter I, both of which generate heat when electrically charged. Inverter I controls the speed of motor M. Exhaust-heat cooler 53 recovers exhaust heat generated during operation of motor for travel use M and inverter for travel use I as the electric automobile travels, as well as preventing overheating of the heat-generating bodies, i.e., motor M and inverter I. Additionally, it is also acceptable to provide a water-temperature sensor for detecting the water temperature of hot water within exhaust-heat cooler 53, so that hot water is cooled by radiator 54 when the water temperature of hot water, which has recovered exhaust heat, rises above a specified temperature.

Radiator 54 is disposed outside the passenger compartment, for example in a location which easily receives travel wind of the electric automobile, and is connected in hot-water heat-radiating path 65 of hot-water cycle 5. Radiator 54 causes high-temperature hot water and cooling air sent by means of cooling fan 66 or travel wind to exchange heat, thus cooling the hot water so that the hot water falls below a specified temperature (for example 70° C. to 85° C.). In addition, bypass passage 67, which allows hot water to bypass radiator 54 so that low-temperature hot water is not cooled by radiator 54, is connected in hot-water cycle 5 in parallel with hot-water heat-radiating path 65.

Figure 6:
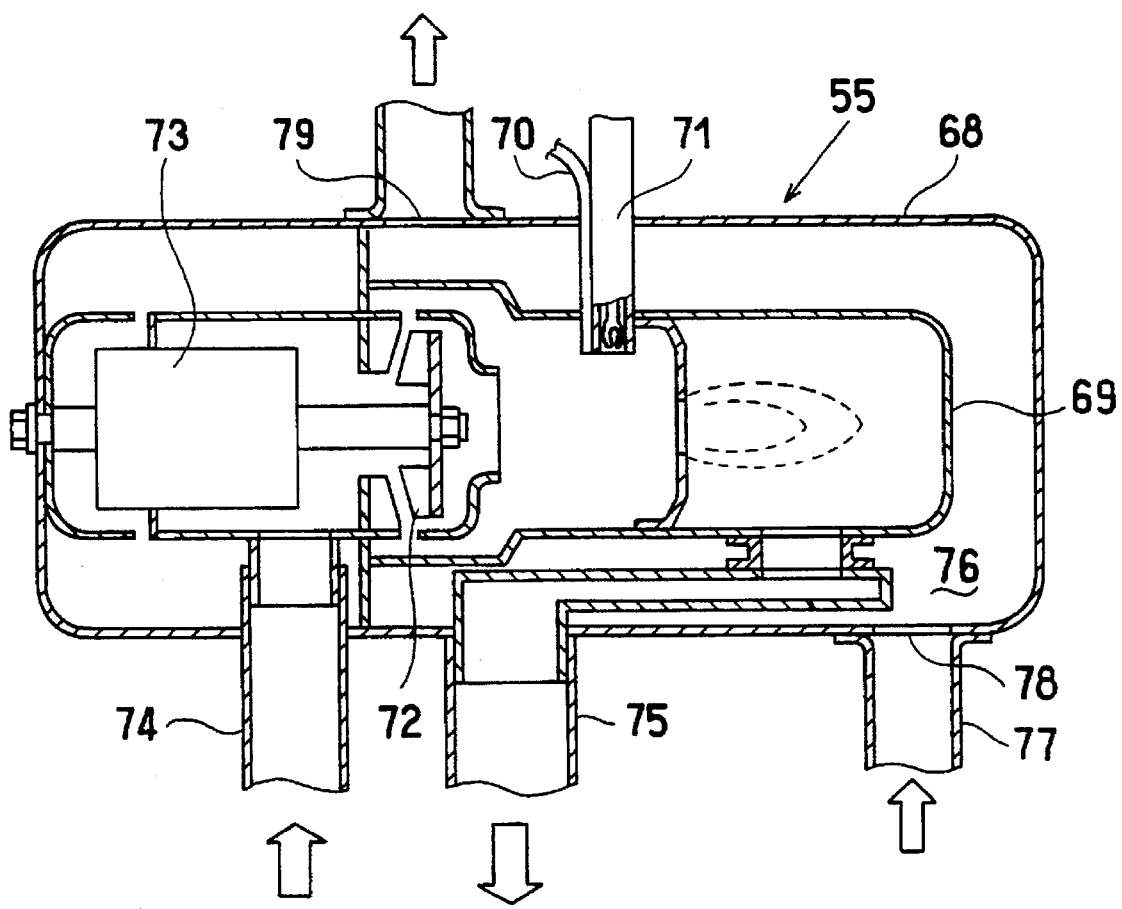
FIG. 6 is a sectional view showing an example of a combustion type heater according to the first embodiment of the present invention.

FIG. 6 indicates an example of a combustion type heater such as the device indicated by reference numeral 55 in FIG. 1. Combustion type heater 55 is mounted outside the passenger compartment of the electric automobile, and is structured from heater case 68 of boxlike configuration, combustion cylinder 69 disposed within heater case 68, fuel pipe 70 which sends fuel into combustion cylinder 69, glow plug 71 which ignites fuel during starting, and electric motor 73, which rotates and drives combustion fan 72, which blows combustion air. Combustion type heater 55 causes fuel such as gasoline, kerosene, diesel oil, or the like to combust in the combustion tube, and provides the quantity of heat thereof to the hot water.

Intake pipe 74 draws in combustion air and exhaust pipe 75 discharges combustion exhaust. Both pipe 74 and 75 are formed below heater case 68. Additionally, heater case 68 includes intake port 78 where hot water flows from combustion type heater passage 77 to hot-water path 76, and discharge port 79 where hot water flows from hot-water path 76. As shown in FIG. 1, fuel pipe 70 is supplied with fuel by means of sending fuel within fuel tank 80 under pressure by means of operation of fuel pump 81.

Additionally, combustion type heater 55 is such that the amount of combustion becomes larger and the quantity of heat provided to the hot water also becomes larger when the amount of fuel sent under pressure from fuel pump 81 is large (HIGH operation). On the other hand, the amount of combustion becomes smaller and the quantity of heat provided to the hot water also becomes smaller when the amount of fuel sent under pressure from fuel pump 81 is small (LOW operation).

Figure 7:
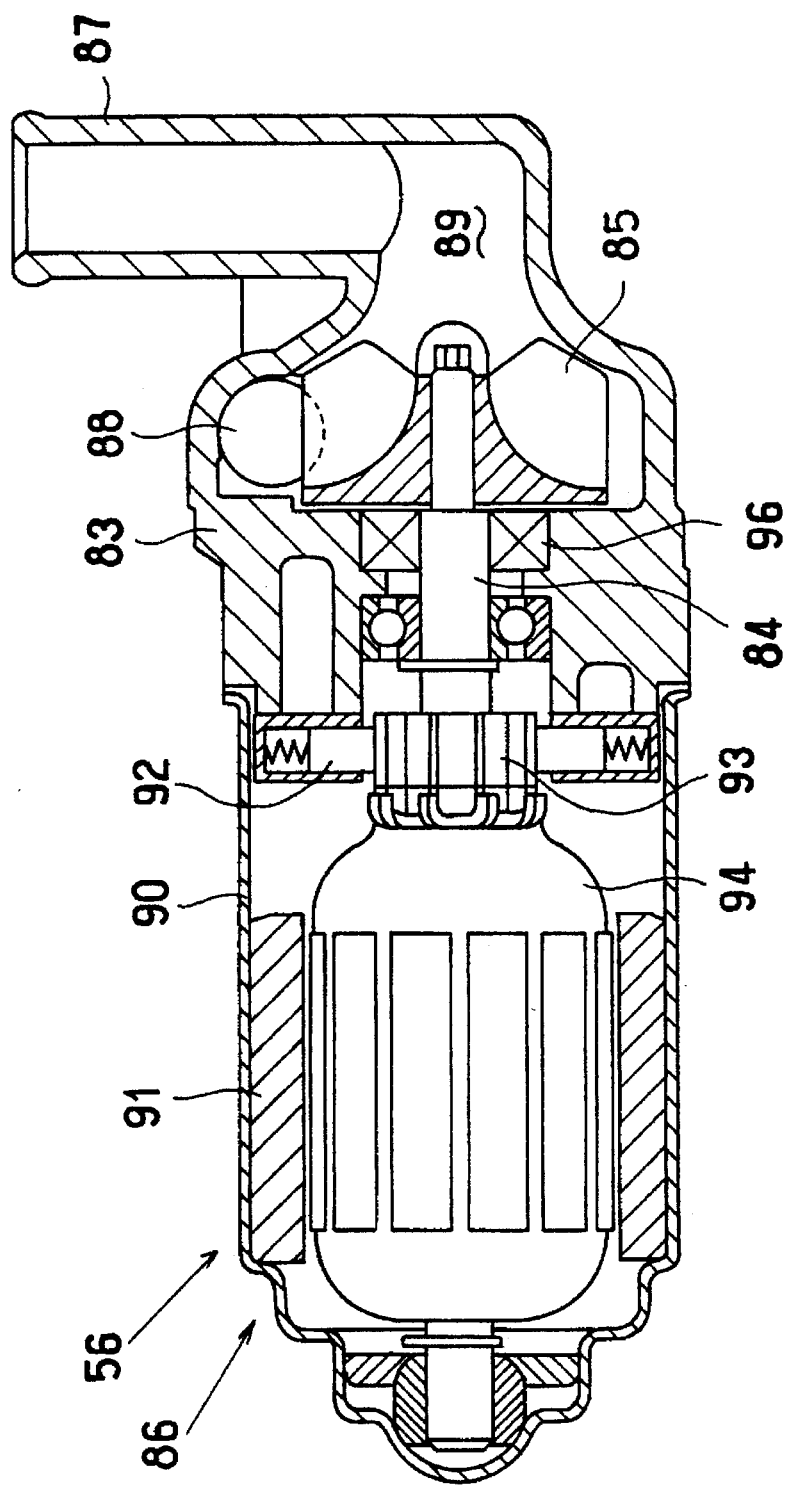
FIG. 7 is a longitudinally sectional view showing a water pump according to the first embodiment of the present invention.
Figure 8:
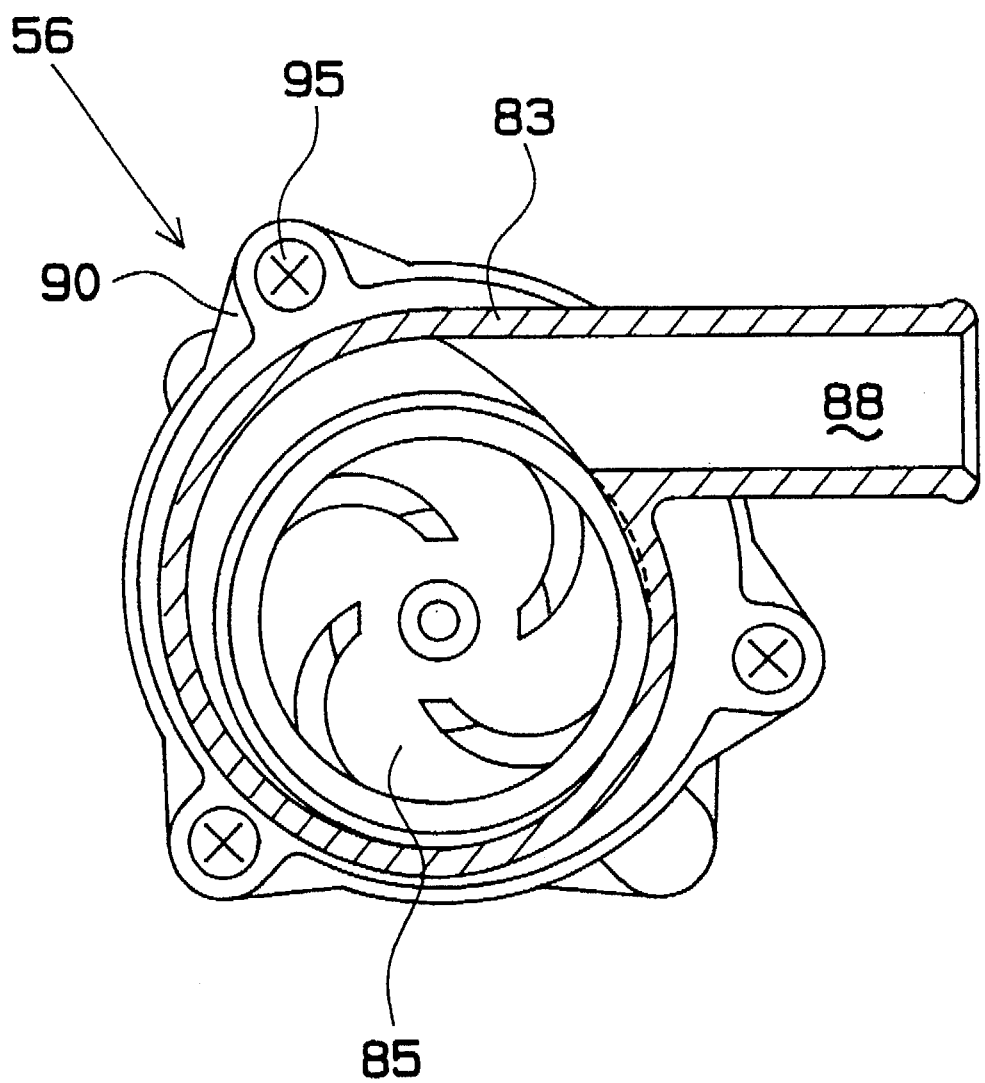
FIG. 8 is a transverse view showing a water pump according to the first embodiment of the present invention.

FIGS. 7 and 8 illustrate an example of a water pump, used as water pump 56 in FIG. 1. Water pump 56 includes motor housing 83, rotating shaft 84 supported to be freely rotatable within motor housing 83, impeller 85 installed on an end portion of rotating shaft 84, electric motor 86 which drives rotating shaft 84, and the like. Suction portion 87 draws hot water into water pump 56 and discharge portion 88 discharges hot water. Suction portion 87 and discharge portion 88 are formed integrally in motor housing 83. Additionally, pump portion 89, which generates recirculating flow in the hot water by means of rotation of the impeller 85, is formed within motor housing 83.

Electric motor 86 includes magnet 91 as a field pole fixed on an inner circumferential surface of motor case 90, armature 94 having commutator 93, which slidingly contacts brush 92. In addition, motor housing 83 and motor case 90 are interconnected by means of tightening three bolts 95. Furthermore, seal material 96 is mounted between motor housing 83 and rotating shaft 84 to prevent leakage of hot water.

Hot-water passage switching valves 57–59 are electromagnetic type hot-water passage switching means to switch the direction of hot-water flow within hot-water cycle 5, and are provided respectively with hot-water heat-radiating path 65, bypass passage 67, and combustion type heater passage 77. Hot-water passage switching valves 27 and 28 are opened when electrically charged and closed when the electrical charging is stopped.

Figure 9:
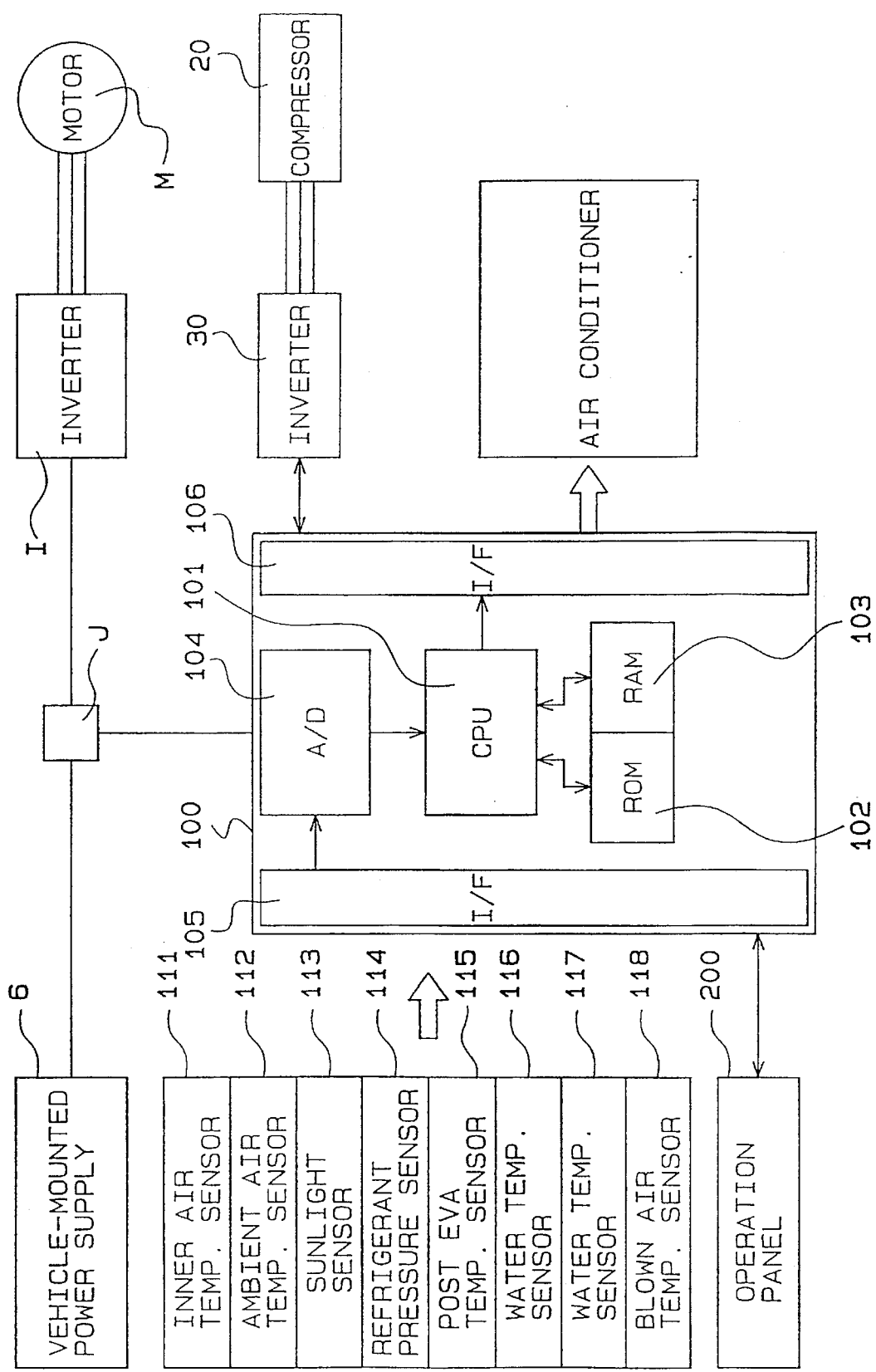
FIG. 9 is a block diagram of an ECU according to the first embodiment of the present invention.

FIG. 9 indicates an ECU of an air-conditioning apparatus for automobile use. ECU 100 includes a central processing unit (hereinafter termed "CPU") 101, ROM 102, RAM 103, A/D converter 104, and interfaces 105 and 106. ECU is itself of a known type. Additionally, ECU 100 is supplied with electrical power to operate from vehicle-mounted power supply 6 via junction box J which is also connected to inverter for travel use I.

ECU 100 controls the operating state of inner/outer air switching damper 9, mode switching dampers 15 to 18, blower motor 19 of blower 3, inverter for air conditioner use 30 of refrigerant compressor 20, refrigerant passage switching valves 27 and 28, electric fan 40, combustion type heater 55, water pump 56, hot-water passage switching valves 57 to 59, air-mix dampers 63 and 64, cooling fan 64, and fuel pump 81 on the basis of input signals input from inner air temperature sensor 111, ambient air temperature sensor 112, sunlight sensor 113, refrigerant pressure sensor 114, post-evaporator temperature sensor 115, water temperature sensors 116 and 117, vent temperature sensor 118, and operation panel 200, and a previously input control program.

Inner air temperature sensor 111 detects the temperature within the passenger compartment (inner air temperature) and sends an output to ECU 100 as an inner air temperature signal. Ambient air temperature sensor 112 detects the temperature outside the passenger compartment (ambient air temperature) and sends an output to ECU 100 accordingly. Sunlight sensor 113 detects the amount of sunlight in the passenger compartment and sends sunlight amount signal to ECU 100. Refrigerant pressure sensor 114 detects the high-pressure pressure of refrigeration cycle 4 and sends refrigerant pressure signal to ECU 100.

Post-evaporator temperature sensor 115 detects the air outlet temperature of the refrigerant evaporator 25 and sends a post evaporative temperature signal to ECU 100. temperature sensor 116 Water comprises a temperature-sensing element, for example, a thermistor, and is disposed in combustion type heater passage 77 on the downstream side of combustion type heater 55. Water temperature sensor 116 detects the temperature of the hot water, and sends a water temperature signal accordingly. Vent temperature sensor 118 detects the temperature of blown air blown into the passenger compartment from FOOT vent 14 of duct 2, and provides a vent temperature signal to ECU 100.

An example of controlling combustion type heater 55 by means of ECU 100 will be described hereinafter. If water temperature sensor 116 disposed in combustion type heater 77 rises above an upper-limit temperature setting (for example 80° C.), ECU 100 sets combustion type heater 55 to LOW operation by means of reducing the drive frequency of fuel pump 81 and reducing the supplied amount of fuel.

Additionally, if while remaining in LOW operation the water temperature of the hot water rises above an overheat temperature (for example 85° C.) higher than the upper-limit temperature setting, ECU 100 causes a notification means (not illustrated) which an operating light or the like to flash, stops drive of fuel pump 81, drives only fan, 72, and starts scavenging (post-purge). At this time, water pump 56 is operated and hot water is made to circulate in hot-water path 76. Accordingly, after the elapse of a specified time (for example 120 seconds) scavenging is ended and all devices of combustion type heater 55 are automatically stopped. Additionally, if water temperature sensor 116 drops below a lower-limit temperature setting (for example 70° C.) which is lower than the upper-limit temperature setting, operation of combustion type heater 55 is again started.

Figure 10:
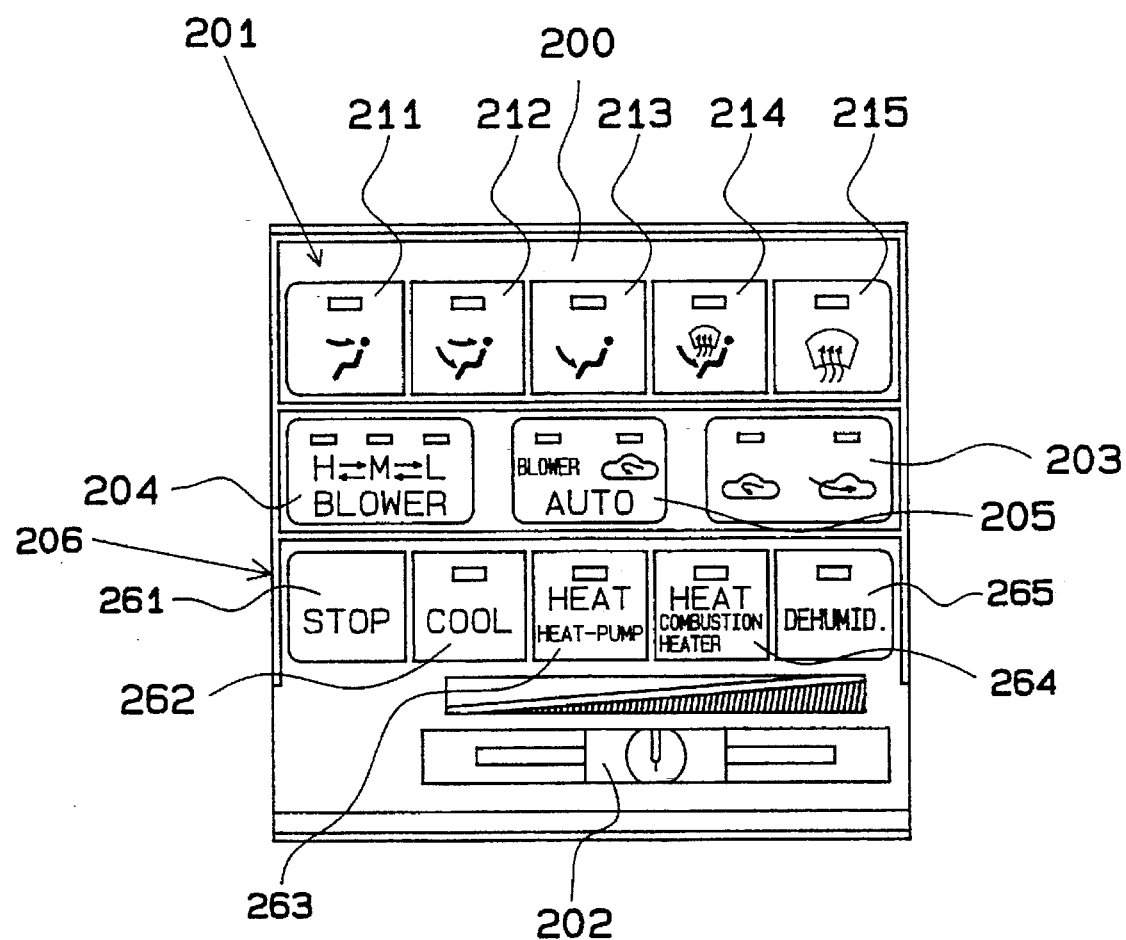
FIG. 10 is a front view showing an example of operation panel according to the first embodiment of the present invention.

FIG. 10 indicates an example of an operation panel. Disposed on operation panel 200 are vent mode selector switch bank 201 to switch the direction of blown air, temperature adjustment lever 202 to adjust the blowing temperature, inner/outer air selector switch 203 to switch between inner and outer air, blower switch 204 to switch the quantity of blown air by manual operation, blower auto switch 205 to switch the quantity of blown air automatically, and air-conditioning mode selector switch bank 206 to switch the air-conditioning mode.

By means of controlling the opening and closing of mode switching dampers 15 to 18, vent mode selector switch bank 201 switches respectively to a FACE mode for blowing air to the head and chest area of a rider, a BILEVEL mode for blowing air to both the head and chest area and the feet of a rider, a FOOT mode for blowing air to the feet of a rider, a FOOT/DEF mode for blowing air to both the feet of a rider and a windshield, and a DEF mode for blowing air to a windshield, and includes a plurality of switches 211–215.

Temperature adjustment lever 202 performs setting of the rotation speed of refrigerant compressor 20 or setting of the degree of opening of air-mix dampers 63 and 64 in the respective air-conditioning modes in accordance with the set position. Temperature adjustment lever 202 is divided into a plurality of setting zones in accordance with the amount of stroke, and setting of the frequency of inverter for air conditioner use 30 which drives refrigerant compressor 20 and rotational speed control are performed in accordance with the selected air-conditioning mode and setting zone.

By controlling the opening and closing of inner/outer air switching damper 9, inner/outer air selector switch 203 switches the inner air circulation mode which takes in inner air from inner air intake port 7 and the outer air intake mode which takes in outer air from outer air intake port 8. Air-conditioning mode selector switch bank 206 switches to stopped operation of air-conditioning apparatus for electric automobile use (in the case of a manual air conditioner) 1, cooler mode, heat-pump hot-water heater mode, combustion heater hot-water heater mode, and dehumidify mode, and includes stop switch, 261, cooling switch 262, heat-pump hot-water heater switch 263, combustion heater hot-water heater switch 264, and dehumidify switch 265.

Figure 11:
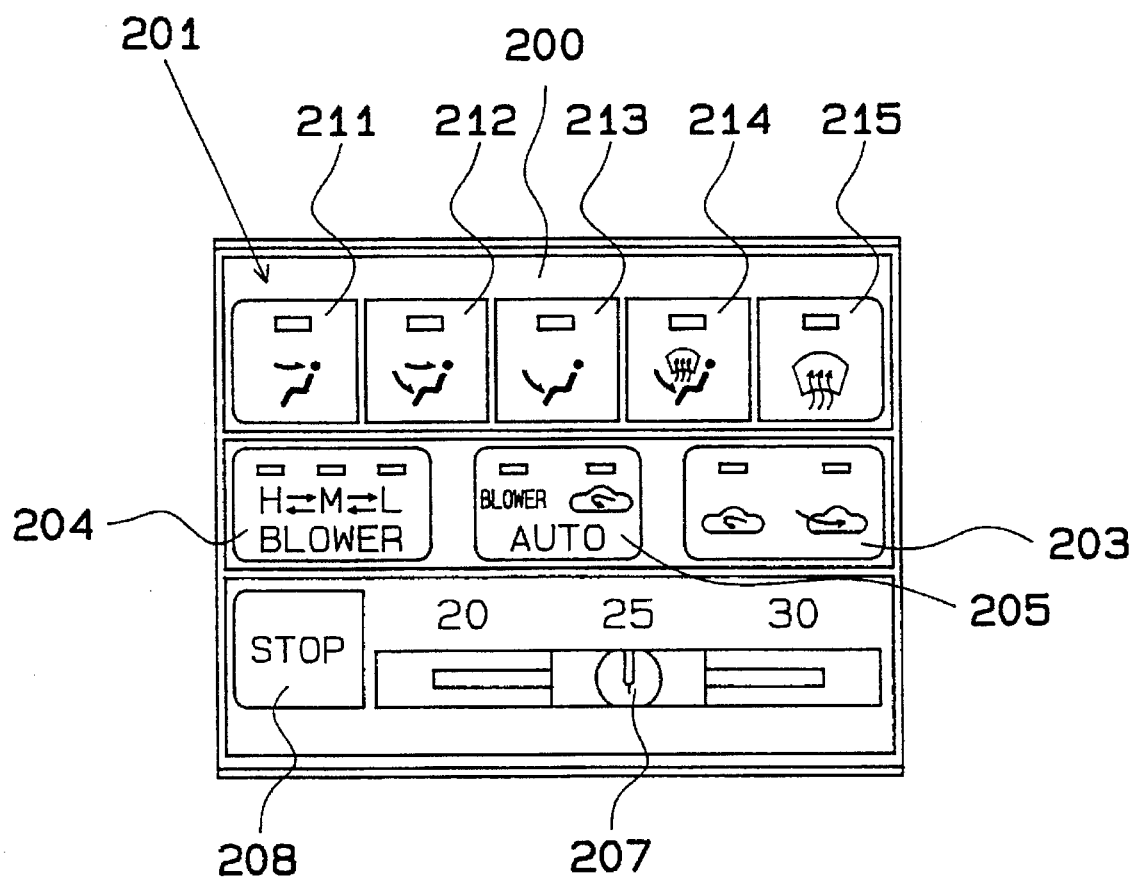
FIG. 11 is a front view showing another example of an operation panel according to the first embodiment of the present invention.

FIG. 11 indicates another example of an operation panel. Operation panel 200 is an operation panel of an automatic air conditioner, and automatically switches a cooler mode, heat-pump hot-water heater mode, combustion heater hot-water heater mode, and dehumidify mode on the basis of temperature adjustment lever 207 and input signals from respective sensors. 208 is an operation-stop switch for air-conditioning apparatus for electric automobile use (in the case of a manual air conditioner) 1.

Next, a mode of operation of air-conditioning apparatus for electric automobile use 1 according to the first embodiment will be described briefly with reference to FIGS. 1 to 12.

During the cooler mode, refrigerant passage switching valve 27 is opened and refrigerant passage switching valve 28 is closed. Consequently, high-temperature, high-pressure gas refrigerant discharged from refrigerant compressor 20 is condensed and liquefied when it passes through refrigerant/water heat exchanger 21 and exterior heat exchanger 23. The liquid refrigerant is depressurized and becomes low-temperature refrigerant of mist configuration (vapor-liquid two-phase refrigerant) when it passes through second pressure-reducing means 24.

This low-temperature refrigerant of mist configuration flows into refrigerant evaporator 25 within duct 2, exchanges heat with air blown by means of operation of blower 3, and is vaporized, after which it flows into accumulator 26. Accordingly, in accumulator 26 the refrigerant is separated in vapor and liquid and only gas refrigerant flows into the refrigerant compressor 20. Meanwhile, air cooled by heat of vaporization of refrigerant in refrigerant evaporator 25 is blown into passenger compartment primarily from CENTER FACE vent 12, by means of which the passenger compartment is cooled.

At this time, of course in a case where there is need to cool vehicle-mounted electrical devices such as motor for travel use M, inverter for travel use I, or any other type of electric vehicle, and even when there is no need thereof, hot water is cooled by air by means of opening hot-water passage switching valve 57, closing hot-water passage switching valves 58 and 59, and causing hot water which has collected the exhaust heat of vehicle-mounted electrical devices at exhaust-heat cooler 53 to circulate to radiator 54. By means of this, hot water entering refrigerant/water heat exchanger 21 is cooled by means of radiator 54 and becomes low-temperature hot water, and because refrigerant/water heat exchanger 21 also functions as a refrigerant condenser, cooler performance is improved. Additionally, in a case wherein sufficient travel wind to cool the hot water is not obtained at radiator 54 because the electric automobile is in a stopped state or low-speed travel state, cooling fan 66 is made to operate so as to perform forced cooling. In addition, electric heater 61 is switched off by means of the heater controller 60.

Accordingly, temperature adjustment of blown air blown into the passenger compartment can be performed by means of adjustment of degree of opening of air-mix dampers 63 and 64 in accordance with the set position of temperature adjustment lever 202. However, from the standpoint of reduced electrical power consumption, which is an important matter for an electric automobile, it is better to fully open air-mix dampers 63 and 64 and cause all air to bypass hot-water heater core 52, and perform rotational speed control of refrigerant compressor 20 by means of inverter for air conditioner use 30, to adjust the temperature of blown air blown into the passenger compartment.

During the heat-pump hot-water heater mode, refrigerant passage switching valve 27 is closed and refrigerant passage switching valve 28 is opened. Consequently, high-temperature, high-pressure gas refrigerant discharged from refrigerant compressor 20 is condensed and liquefied when it passes through refrigerant/water heat exchanger 21. The liquid refrigerant is depressurized and becomes low-temperature refrigerant with a misty configuration (vapor-liquid two-phase refrigerant) when it passes through first pressure-reducing means 22.

This low-temperature refrigerant flows into exterior heat exchanger 23 where it exchanges heat with ambient air blown by means of electric fan 40, and is vaporized, after which it flows into accumulator 26. Accordingly, in accumulator 26 the refrigerant is separated into vapor and liquid and only gas refrigerant flows into refrigerant compressor 20.

Meanwhile, in hot-water cycle 5, the hot-water passage switching valves 57 and 59 are closed and hot-water passage switching valves 58 is opened. Consequently, hot water which passes through bypass passage 67 and flows into refrigerant/water heat exchanger 21 by means of operating water pump 56 is heated by means of condensation heat of the refrigerant. This heated hot water flows into hot-water heater core 52 within duct 2 and exchanges heat with air blown by means of operation of blower 3, and the air becomes hot air. This hot air is blown into the passenger compartment primarily from FOOT vent 14, by means of which the passenger compartment is heated.

Figure 12:
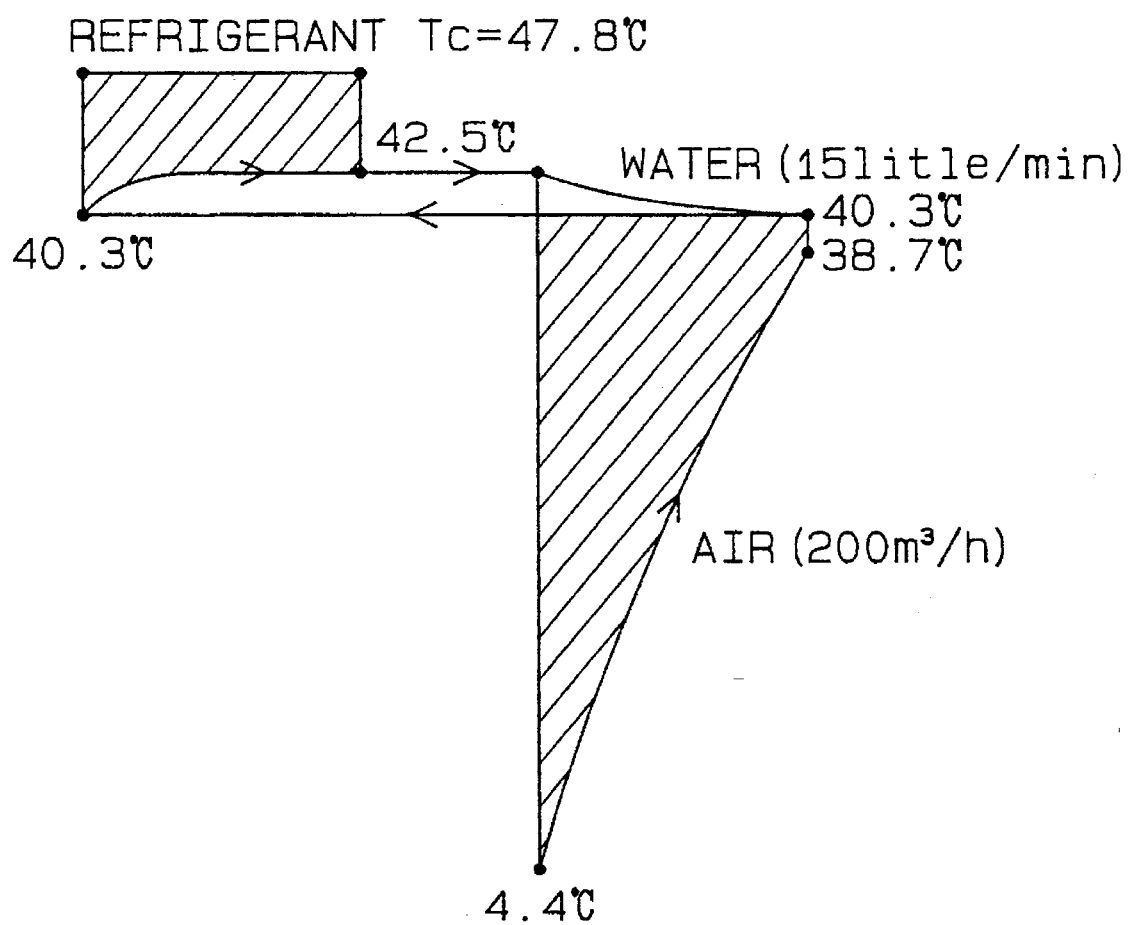
FIG. 12 indicates the respective temperature states of a hot-water cycle according to the first embodiment of the present invention.

FIG. 12 illustrates a state of water temperature change of the hot water and of the temperature change of ambient air. This is the respective temperature state when the amount of blown ambient air is 200 m$^3$/h, ambient temperature (equal to the intake air temperature of hot-water heater core 52) is 4.4° C., condensation temperature Tc of refrigerant/water heat exchanger 21 is 47.8° C., the amount of circulation of hot water within hot-water cycle 5 is 15 liters/minute, and the thermal load in the passenger compartment is 2.3 kW.

Hot water with a water temperature of 40.3° C. flows into refrigerant/.water heat exchanger 21, and by means of exchanging heat with refrigerant with a high temperature of 47.8° C., the water temperature rises 2.2° C. and achieves a water temperature of 42.5° C. at the outlet of refrigerant/water heat exchanger 21. Accordingly, this hot water with a water temperature of 42.5° C. flows into hot-water heater core 52, and by means of exchanging heat with ambient air with a temperature of 4.4° C. and being cooled, the water temperature drops 2.2° C. and achieves a water temperature of 40.3° C. at the outlet of refrigerant/water heat exchanger 21.

Meanwhile, the air which exchanged heat with the hot water at hot-water heater core 52 and deprived the hot water of its retained heat experiences a 34.3° C. temperature rise and becomes 38.7° C. By means of this, the temperature of air blown into the passenger compartment from FOOT vent 14 becomes 38.7° C. and sufficient heating of the passenger compartment can be performed.

Accordingly, hot water which radiated heat at hot-water heater core 52 returns again to water pump 56. At this time, exhaust heat from motor for travel use M and inverter for travel use I can also be used effectively as an auxiliary heat source at exhaust-heat cooler 53 connected midway in hot-water cycle 5.

Additionally, in a case wherein a sufficient quantity of heat cannot be obtained only with the condensation heat of the refrigerant of refrigerant/water heat exchanger 21, it is also acceptable to assist in heating the hot water at electric hot-water heater 51 by means of operating heater controller 60 and electrically charging electric heater 61. Moreover, because the hot-water passage switching valve 57 is closed, radiated-heat loss due to radiator 54 can be prevented.

Accordingly, in the same manner as for the cooler mode, temperature adjustment of the air blown into the passenger compartment can be performed by means of adjusting the degree of opening of air-mix dampers 63 and 64 in accordance with the set position of temperature adjustment lever 202, but it is better to fully open air-mix dampers 63 and 64 and cause all air to bypass hot-water heater core 52, and perform rotational speed control of refrigerant compressor 20 by means of inverter for air conditioner use 30, to adjust the temperature of air blown into the passenger compartment.

Depending on the destination region there may be cases wherein ambient temperature is extremely low (for example a cold-climate region of −10° C. to −30° C. or less) and a sufficient quantity of heat cannot be obtained with the refrigerant/water heat exchanger 21 and electric hot-water heater 51. In such a case, hot-water passage switching valves 57 and 58 are opened, hot-water passage switching valve 58 is closed, and the required quantity of heat is provided to the hot water by means of combustion type heater 55, without driving refrigerant compressor 20.

Hereinafter, the mode of operation of combustion type heater 55 will be described briefly with reference to FIG. 1 and FIG. 6. Fuel sent by operation of fuel pump 81 is vaporized in combustion cylinder 69, and during starting the fuel is ignited by glow plug 71, or while running is mixed with combustion air sent by means of operation of combustion fan 72 and is combusted. Combustion exhaust passes within the combustion cylinder 69 so as to exchange heat more completely with hot water flowing within hot-water path 76 and is discharged from exhaust pipe 75. This combustion exhaust performs substantially complete combustion and so is a clean gas.

Meanwhile, hot water enters within hot-water path 76 from intake port 78, passes around combustion cylinder 69, and is heated, then is discharged from discharge port 79 and is supplied to hot-water heater core 52. By means of this, hot water of considerably high temperature is circulated in hot-water heater core 52 even when ambient temperature is extremely low and heat-pump hot-water heating cannot be performed, and so the passenger compartment can be heated with a sufficient quantity of heat.

During the dehumidify mode, in the same manner as for the cooler mode, refrigerant passage switching valve 27 is opened and refrigerant passage switching valve 28 is closed. By means of this, air blown into refrigerant evaporator 25 by means of operation of blower 3 is cooled. Accordingly, moisture in the air is condensed and adheres to the fins or the like of refrigerant evaporator 25, by means of which the air is dehumidified.

Moreover, in a case where reheating of dehumidified air is desired, it is acceptable to cause air-mix dampers 63 and 64 to operate, lead a portion or all of the air thereof into the hot-water heater core 62, and cause heat exchange with the hot water. At this time, it is acceptable to selectively use refrigerant/water heat exchanger 21, combustion type heater 55, electric heater 61, or the like which is a natural heat source as the method of heating the hot water depending on the ambient temperature condition at that time.

In the above-described manner, because the air-conditioning apparatus for electric automobile use 1 causes hot water heated by means of condensation heat of refrigerant at the refrigerant/water heat exchanger 21 to flow into hot-water heater core 52 and heats air flowing within duct 2, sufficient heater capacity can be obtained even in a region (for example a region where the ambient air temperature drops to $-10°$ C. to $-30°$ C. or less) where heater capacity was insufficient with a heat-pump heater according to the prior art which made an interior heat exchanger function as a condenser to perform heating of a passenger compartment. Additionally, because an existing heater unit provided with hot-water heater core 52 and the vent switching mechanism can be utilized, the need to provide an air-conditioning unit (passenger compartment unit 10) is eliminated, and so cost can be reduced.

Additionally, because hot water heated by means of combustion heat of combustion type heater 55 is caused to flow into hot-water heater core 52 and heat air flowing within duct 2, sufficient heater capacity can be obtained even in a region (for example a region where the ambient air temperature drops to $-10°$ C. to $-30°$ C. or less) where heater capacity was insufficient with a heat-pump heater according to known devices, which made an interior heat exchanger function as a condenser to perform heating of a passenger compartment. Additionally, because add-on assembly of combustion type heater 55 can be performed simply by combining combustion type heater 55 with air-conditioning apparatus for electric automobile use 1 provided with hot-water cycle 5, cost can be reduced.

Furthermore, because vehicle-mounted electrical devices such as the motor for travel use M and inverter for travel use I are provided with hot water by exhaust-heat cooler 53 and the hot water heated by means of this exhaust heat is made to flow into the hot-water heater core 52 and heat air flowing within duct 2, exhaust heat of vehicle-mounted electrical devices can be used effectively for heating the passenger compartment, and so the energy of the vehicle-mounted power supply 6 can be utilized effectively.

[The Second Embodiment]

Figure 13:
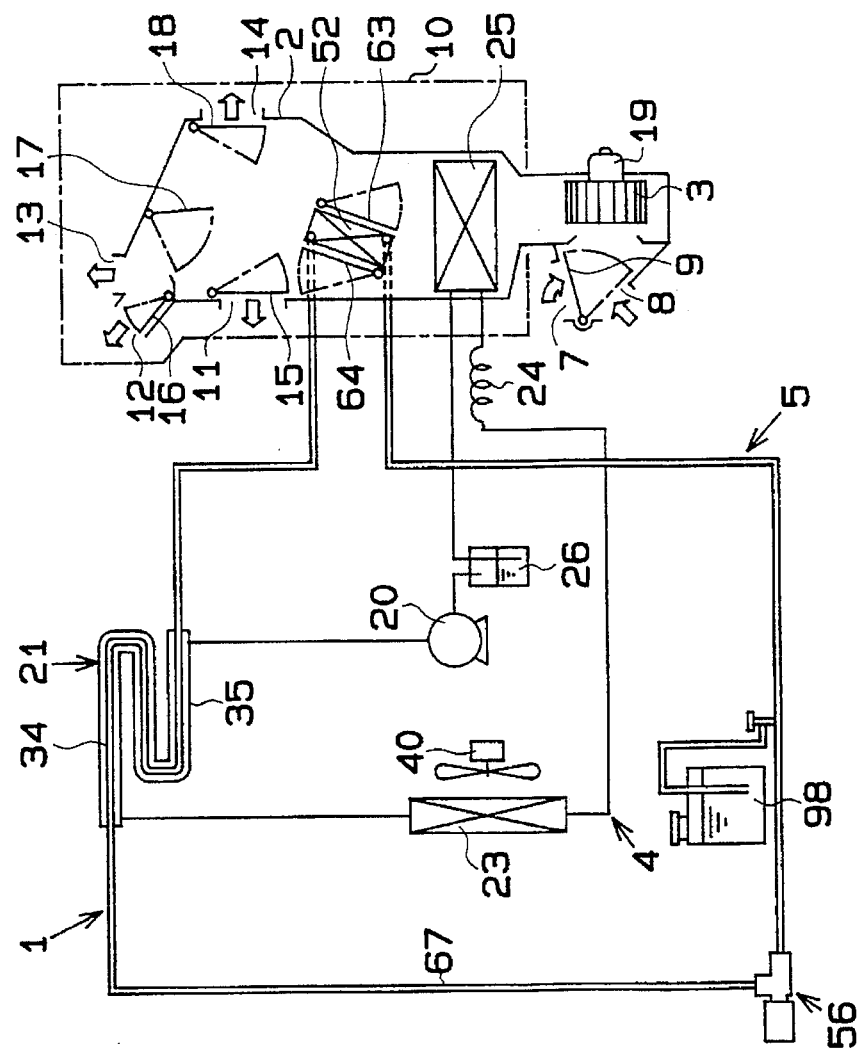
FIG. 13 is a structural view showing a second embodiment of the present invention.

FIG. 13 illustrates a second embodiment according to the present invention, and shows an air-conditioning apparatus for electric automobile use. According to this embodiment, first pressure-reducing means 22, refrigerant passage switching valves 27 and 28, and bypass pipelines 41 and 42 are eliminated from refrigeration cycle 4, thereby simplifying refrigeration cycle 4. Additionally, electric hot-water heater 51, exhaust-heat cooler 53, radiator 54, combustion type heater 55, hot-water passage switching valves 57 to 59, hot-water heat-radiating path 65, and combustion type heater passage 77 are eliminated from hot-water cycle 5, simplifying hot-water cycle 5. Moreover, reserve tank 98 is installed in hot-water cycle 5.

Furthermore, according to the present embodiment as well, switching of the cooler mode and the heat-pump dehumidification hot-water heater mode and capacity control of heater capacity and cooler capacity can be performed by means of rotational speed control of refrigerant compressor 20, control of the degree of opening of air-mix dampers 63 and 64, operation control of water pump 56, and the like. Accordingly, it is preferable to employ this embodiment in an electric automobile traveling in regions (for example a region with an air temperature of $0°$ C. or more) where the required quantity of heat can be obtained by means of the heat-pump dehumidification hot-water heater mode.

[The Third Embodiment]

Figure 14:
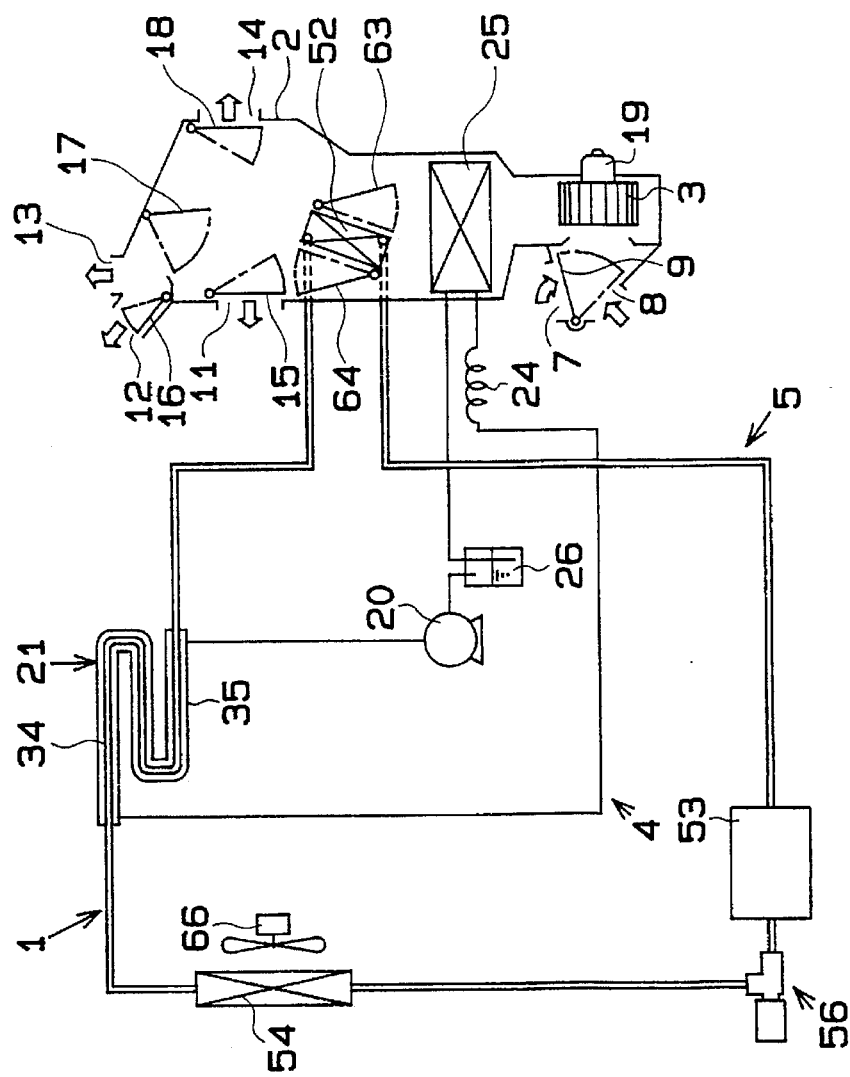
FIG. 14 is a structural view showing a third embodiment of the present invention.

FIG. 14 illustrates a third embodiment of the present invention, and shows an air-conditioning apparatus for electric automobile use. According to this embodiment, exterior heat exchanger 23 is further eliminated from refrigeration cycle 4 according to the second embodiment, simplifying the refrigeration cycle 4. Conversely, exhaust-heat cooler 53 and radiator 54 are added to hot-water cycle 5 according to the second embodiment, and exhaust heat of vehicle-mounted electrical devices such as motor for travel use M and inverter for travel use I is utilized during the heat-pump dehumidification hot-water heater mode.

[The Fourth Embodiment]

Figure 15:
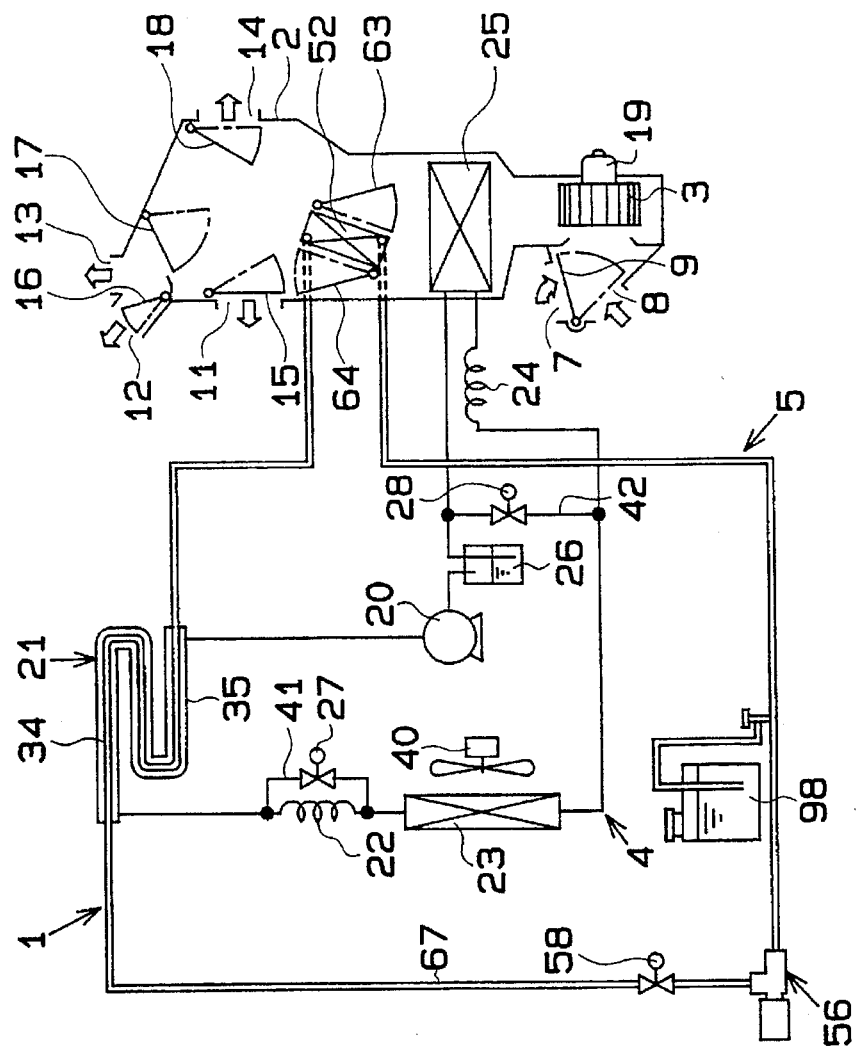
FIG. 15 is a structural view showing a fourth embodiment of the present invention.

FIG. 15 illustrates the fourth embodiment according to the present invention, and shows an air-conditioning apparatus for electric automobile use. According to the present embodiment, electric hot-water heater 51, exhaust-heat cooler 53, radiator 54, combustion type heater 55, hot-water passage switching valves 57 and 59, hot-water heat-radiating path 65, and combustion type heater passage 77 are eliminated from hot-water cycle 5 according to the first embodiment, simplifying hot-water cycle 5.

Furthermore, also according to the present embodiment, switching of the cooler mode, dehumidify mode, and heat-pump hot-water heater mode and also capacity control of heater capacity and cooler capacity can be performed by means of rotational speed control of refrigerant compressor 20, control of the degree of opening of air-mix dampers 63 and 64, operating state of water pump 56, and the like.

[The Fifth Embodiment]

Figure 16:
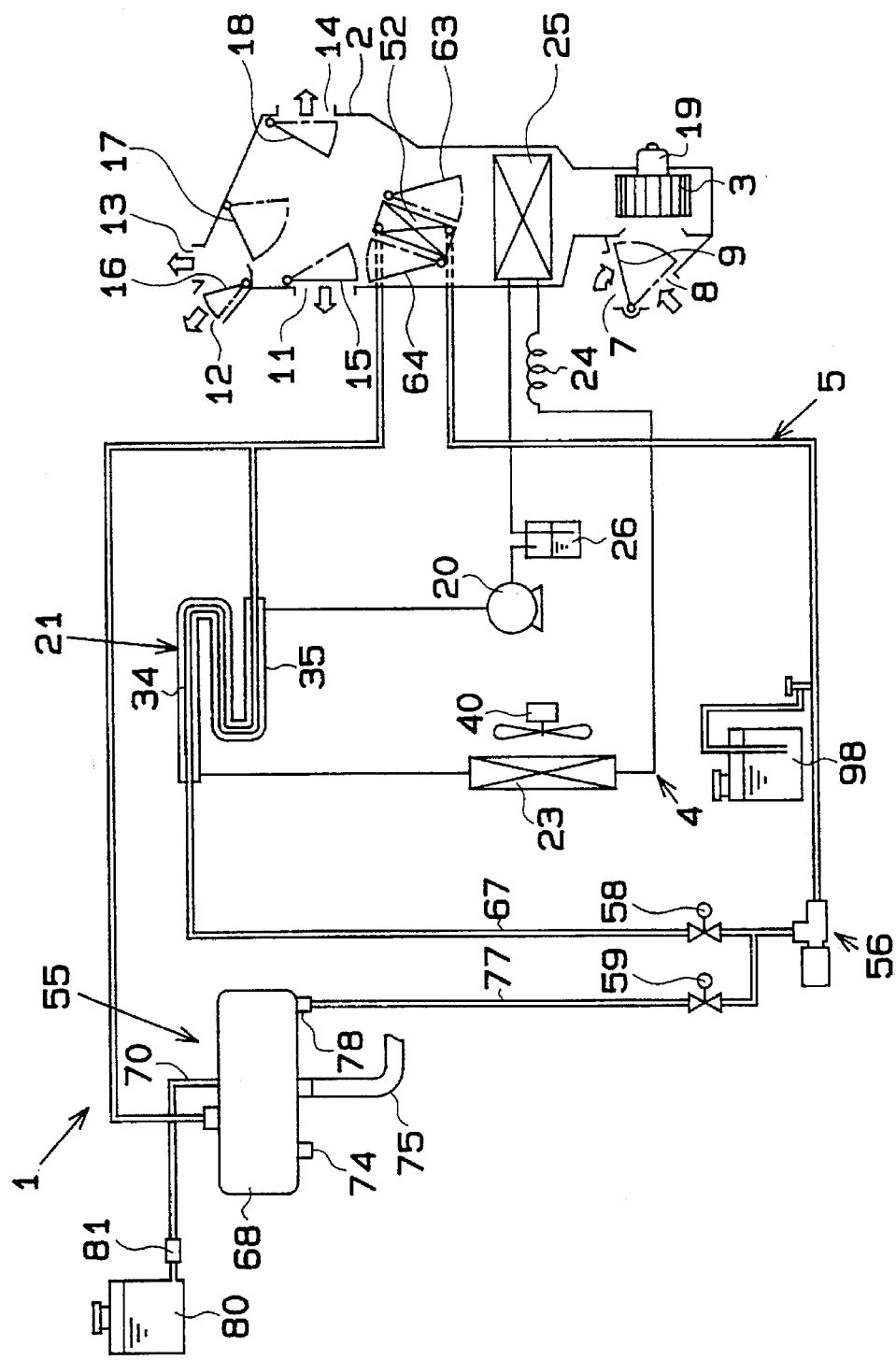
FIG. 16 is a structural view showing a fifth embodiment of the present invention.

FIG. 16 illustrates a fifth embodiment according to the present invention, and shows an air-conditioning apparatus for electric automobile use. According to the present embodiment, combustion type heater 55 is added to hot-water cycle 5 according to the second embodiment, and a cooler mode, heat-pump dehumidification hot-water heater mode, and combustion heater mode can be switched. Moreover, because this embodiment can ensure a sufficient quantity of heat by means of selecting a combustion heater hot-water heater mode, it becomes possible to be employed as air-conditioning apparatus for electric automobile use 1 for cold climates (for example a region with an air temperature is −10° C. or less) where the required quantity of heat can be obtained by means of the heat-pump dehumidification hot-water heater mode.

Here, as a method of adding combustion type heater 55 to hot-water cycle 5, a T-shaped connection pipe or Y-shaped connection pipe is connected to the branch point and union point of bypass passage 67 and combustion type heater passage 77, and adding on of a of a combustion type heater unit composed of combustion type heater 55, combustion type heater passage 77, and the like can be accomplished by a simple assembly operation. Consequently, according to this embodiment, hot-water cycle 5 provided with refrigerant/water heat exchanger 21 and hot-water heater core 52 is mounted in duct 2, and so combustion type heater 55 can be combined with air-conditioning apparatus for electric automobile use 1 of refrigeration cycle 4, hot-water cycle 5, and the like with an extremely simply assembly operation. Moreover, in a case wherein combustion type heater unit is not installed, it is acceptable to block combustion type heater 55 communicating port of the T-shaped connection pipe or Y-shaped by means of a cap or the like.

[The Sixth Embodiment]

Figure 17:
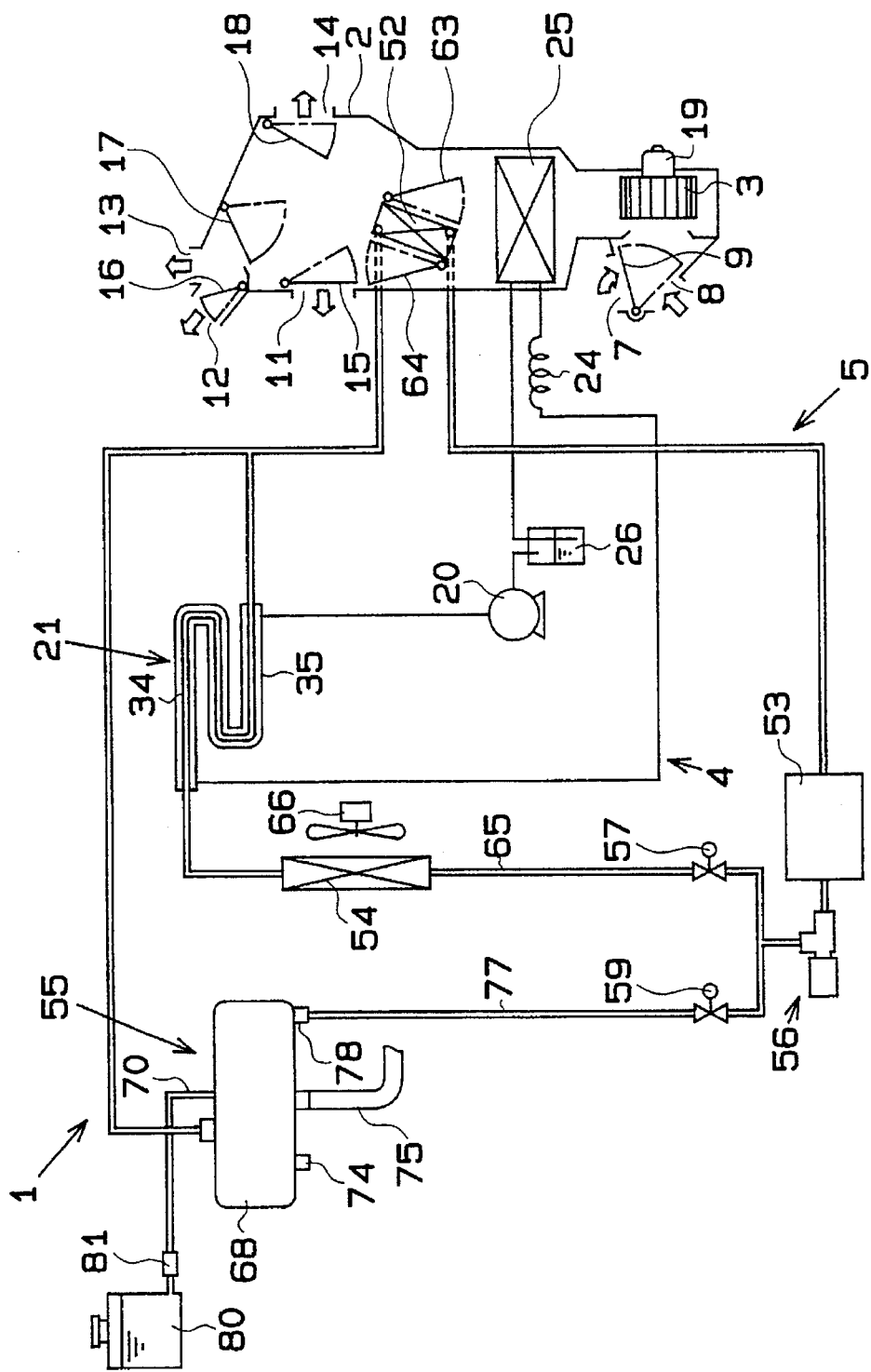
FIG. 17 is a structural view showing a sixth embodiment of the present invention.

FIG. 17 illustrates a sixth embodiment according to the present invention, and shows an air-conditioning apparatus for electric automobile use. According to the present embodiment, combustion type heater 55 is added to hot-water cycle 5 according to the third embodiment, and a cooler mode, heat-pump dehumidification hot-water heater mode, and combustion heater mode can be switched. According to this embodiment as well, a sufficient quantity of heat can be ensured by means of selecting a combustion heater hot-water heater mode.

[The Seventh Embodiment]

Figure 18:
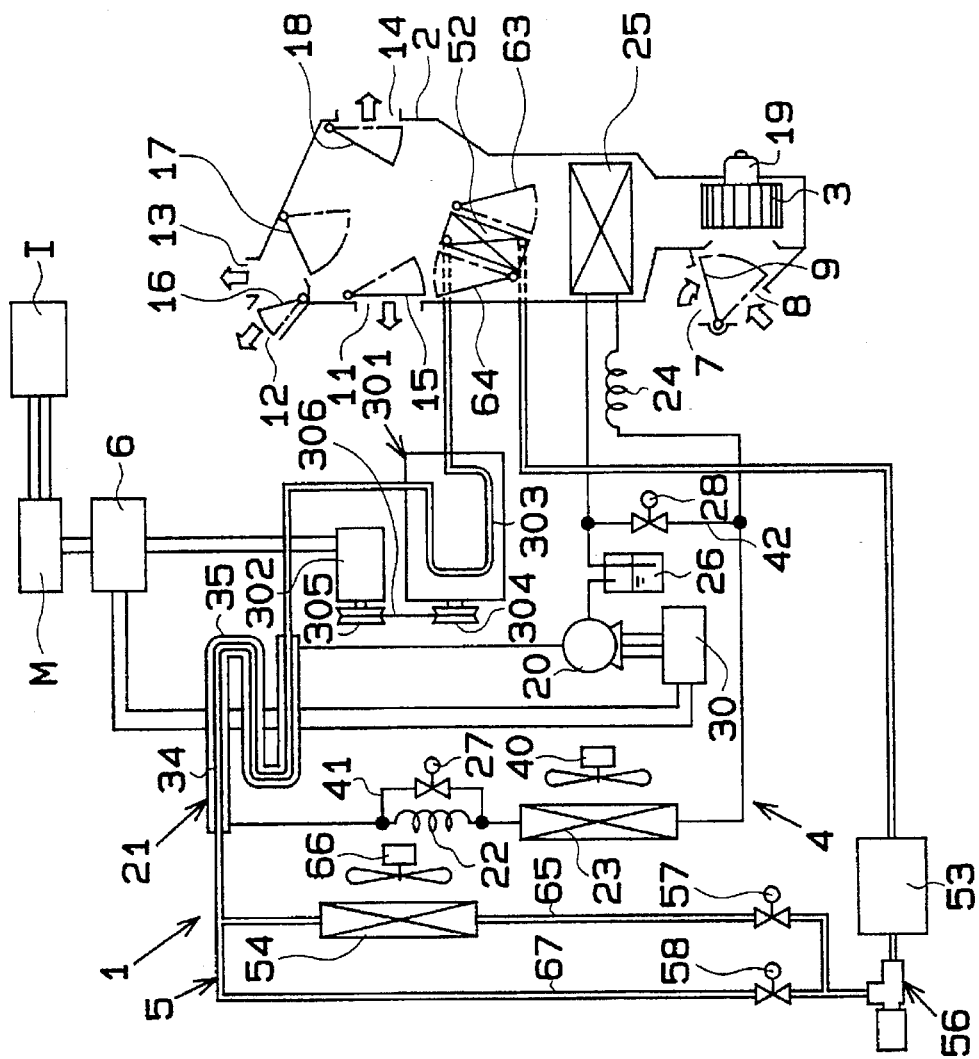
FIG. 18 is a structural view showing a seventh embodiment of the present invention.

FIG. 18 illustrates a seventh embodiment according to the present invention, and shows an air-conditioning apparatus for electric automobile use. According to the present embodiment, water-cooled type internal combustion engine 301 is connected in series between the outlet of hot-water path 34 of refrigerant/water heat exchanger 21 and the inlet of hot-water heater core 52 of hot-water cycle 5. Internal combustion engine 301 is a drive means to rotate and drive electrical generator 302, and has water-cooling portion 303 in the interior of which coolant water circulates.

Additionally, electrical generator 302 performs electrical charging of vehicle-mounted power supply 6 by means of generated electrical power, along with performing the supply of electrical power to vehicle-mounted electrical devices such as inverter for air conditioner use 30 of refrigerant compressor 20. Furthermore, internal combustion engine 301 and electrical generator 302 are driven and interconnected by means of pulleys 304, 305, and belt 306.

According to this embodiment, because water-cooled type internal combustion engine 301 which rotates and drives electrical generator 302 is provided, hot-water exhaust heat generated as a result of the running of internal combustion engine 301 can be effectively utilized in heater operation by means of a heat-pump hot-water heater mode. For example, when the temperature of hot water which exchanges heat with high-temperature, high-pressure gas refrigerant within refrigerant/water heat exchanger 21 is 60° C., then when this hot water passes through water-cooling portion 303 of internal combustion engine 301, the hot water recovers the exhaust heat of internal combustion engine 301 and is heated to become hot water with a temperature of about 80° C., and the heating capacity of air flowing within duct 2 is vastly improved by means of this hot water being supplied to hot-water heater core 52.

In this manner, hot-water exhaust heat of internal combustion engine 301 can be utilized, and so because the heater capacity of air-conditioning apparatus for electric automobile use 1 is improved, heater capacity during the heat-pump hot-water heater mode which does not utilize combustion type heater 55 is improved. Moreover, application in heat-pump hot-water heater operation in a cold-climate region with extremely low (for example −5° C. to −20° C.) ambient air temperature is possible even when the combustion type heater 55 is not utilized.

[The Eighth Embodiment]

Figure 19:
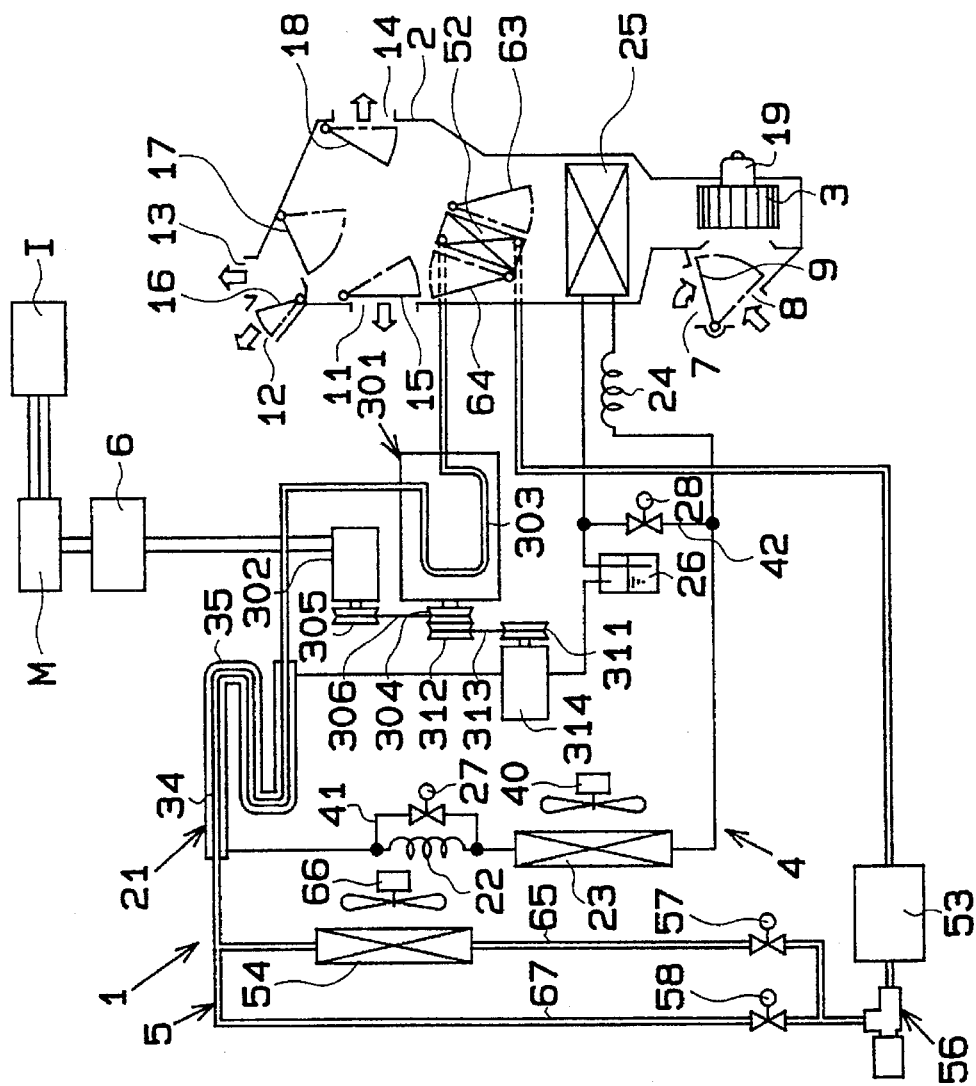
FIG. 19 is a structural view showing an eighth embodiment of the present invention.

FIG. 19 illustrates an eighth embodiment according to the present invention, and shows an air-conditioning apparatus for electric automobile use. According to the present embodiment, internal combustion engine 301 rotates and drives refrigerant compressor 314 of refrigeration cycle 4 via pulleys 311 and 312 and belt 313. Moreover, refrigeration cycle 4 is a known refrigeration cycle for gasoline engine-mounted vehicle use, and is a low-cost article which does not have an electric motor.

According to this embodiment, because an article driven by means of internal combustion engine 301 is employed in the refrigeration cycle 4, air-conditioning apparatus for electric automobile use 1 can be used not only in an electric automobile but also in an ordinary vehicle mounted with an internal combustion engine.

[The Ninth Embodiment]

Figure 20:
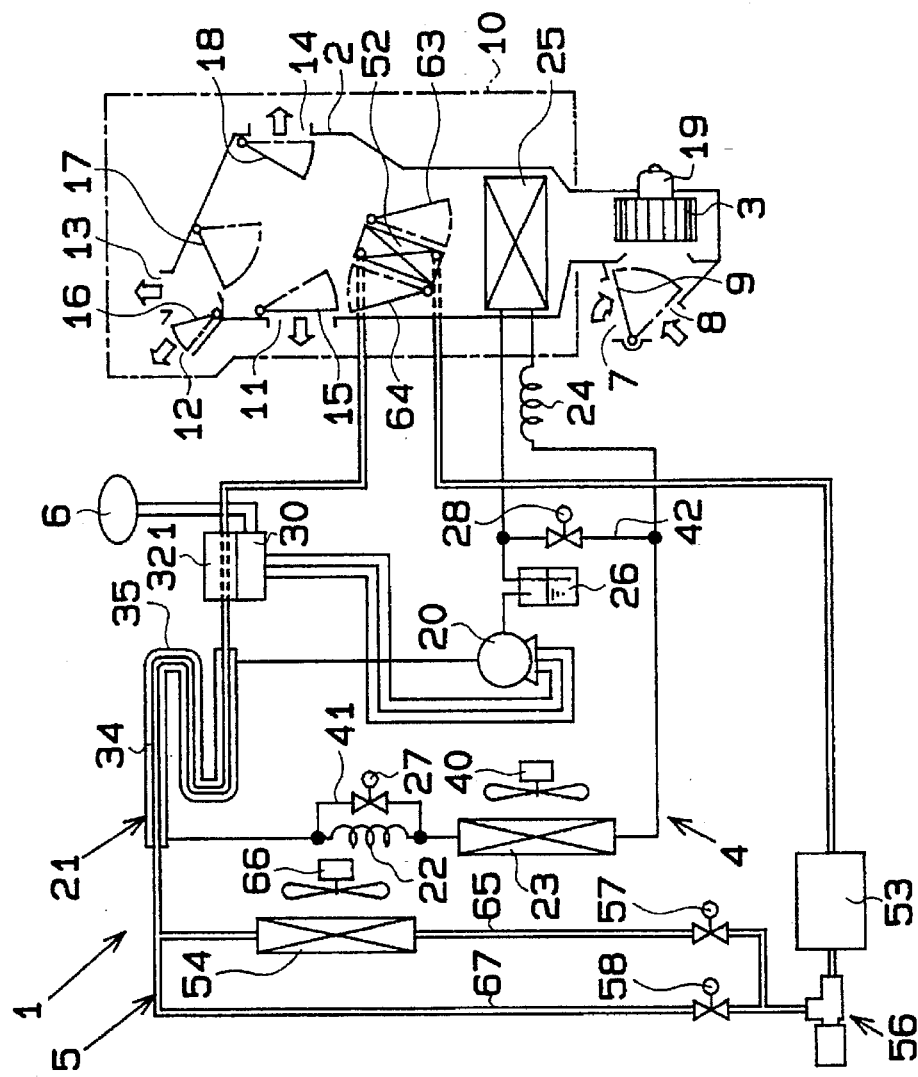
FIG. 20 is a structural view showing a ninth embodiment of the present invention.
Figure 21:
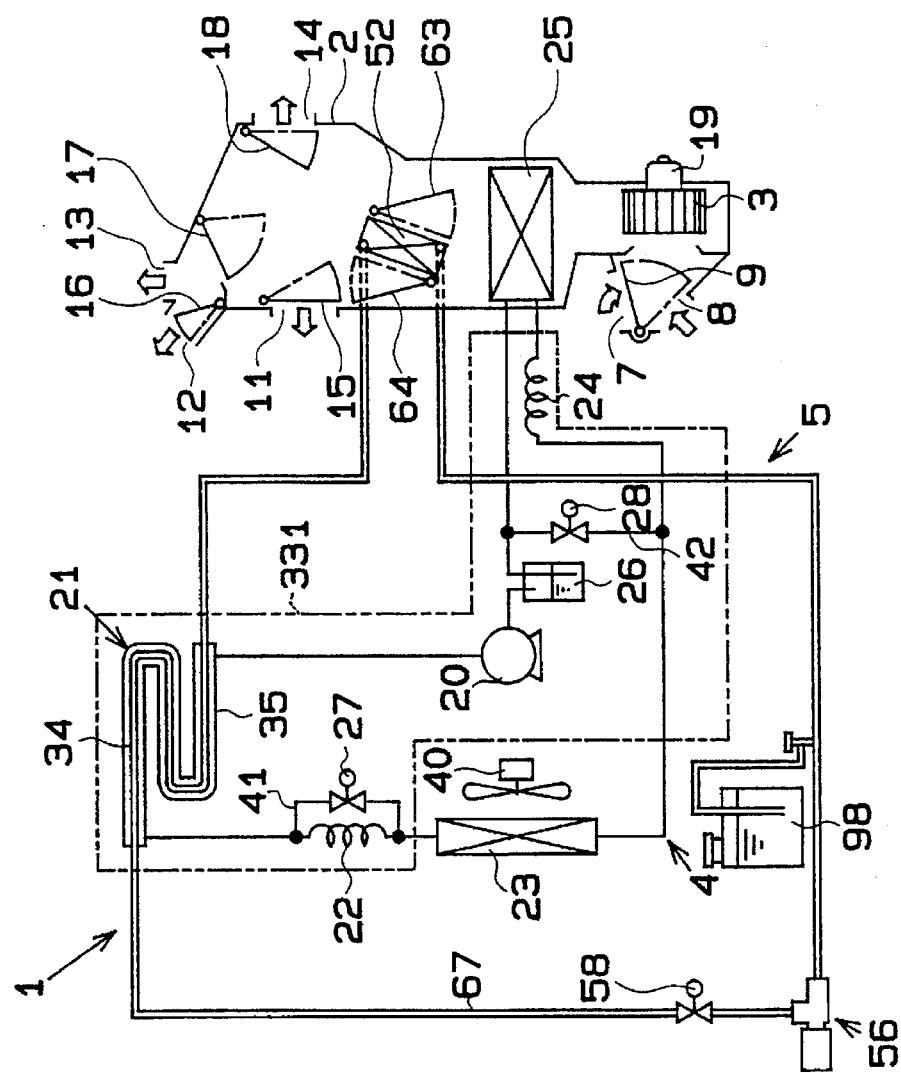
FIG. 21 is a structural view showing a tenth embodiment of the present invention.

FIG. 20 illustrates a ninth embodiment according to the present invention, and shows an air-conditioning apparatus for electric automobile use. According to the present embodiment, exhaust-heat cooler 321 is connected in series between the outlet of hot-water path 34 of refrigerant/water heat exchanger 21 and the inlet of hot-water heater core 52 of hot-water cycle 5.

Exhaust-heat cooler 321 is provided with a hot-water chamber (not illustrated) into which hot water flows at the outer periphery of a plate material with excellent thermal conductivity, thus cooling a heat-generating body such as a transistor or the like installed in inverter for air conditioner use 30 which controls the rotational speed of electrical type refrigerant compressor 20. Exhaust-heat cooler 321 recovers exhaust heat generated along with operation of inverter for air conditioner use 30, as well as preventing overheating of the heat-generating body. Moreover, in the same manner as for exhaust-heat cooler 53, it is also acceptable to provide a water-temperature sensor for detecting the water temperature of hot water within exhaust-heat cooler 321, so that hot water is cooled by radiator 54 when the water temperature of hot water which has recovered exhaust heat rises above a specified temperature.

According to this embodiment, because exhaust-heat cooler 321 is connected in series between refrigerant/water heat exchanger 21 and hot-water heater core 52 of hot-water cycle 5, exhaust heat generated along with operation of inverter for air conditioner use 30 can be effectively utilized in heater operation by means of the heat-pump hot-water heater mode. Additionally, because inverter for air conditioner use 30 is water-cooled, greater compactness can be achieved in comparison with an article employing air-cooled fins as a cooling means of inverter for air conditioner use 30.

[The Tenth Embodiment]

Figure 22:
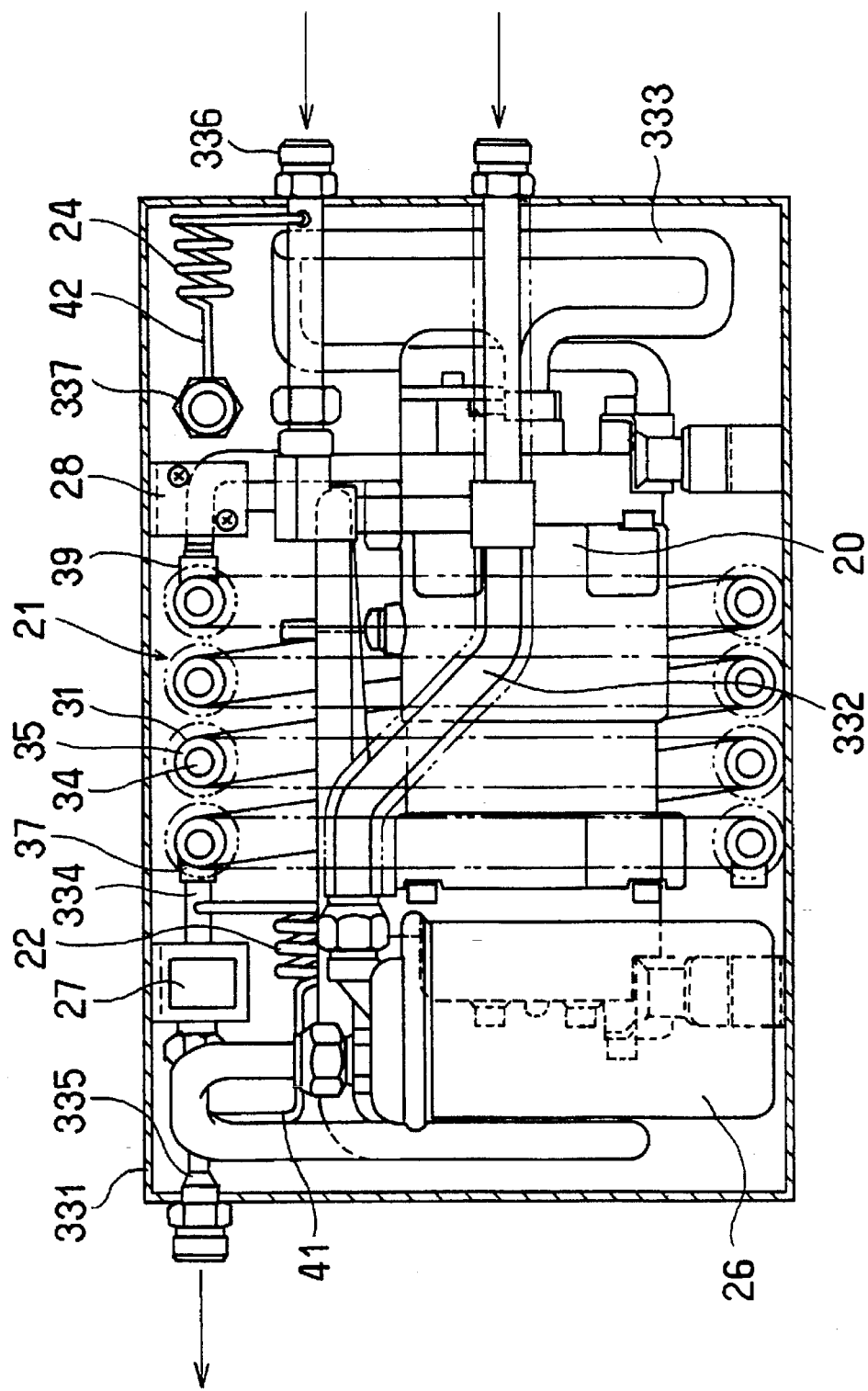
FIG. 22 is a front view showing refrigeration devices housed in an refrigeration device housing according to the tenth embodiment of the present invention.
Figure 23:
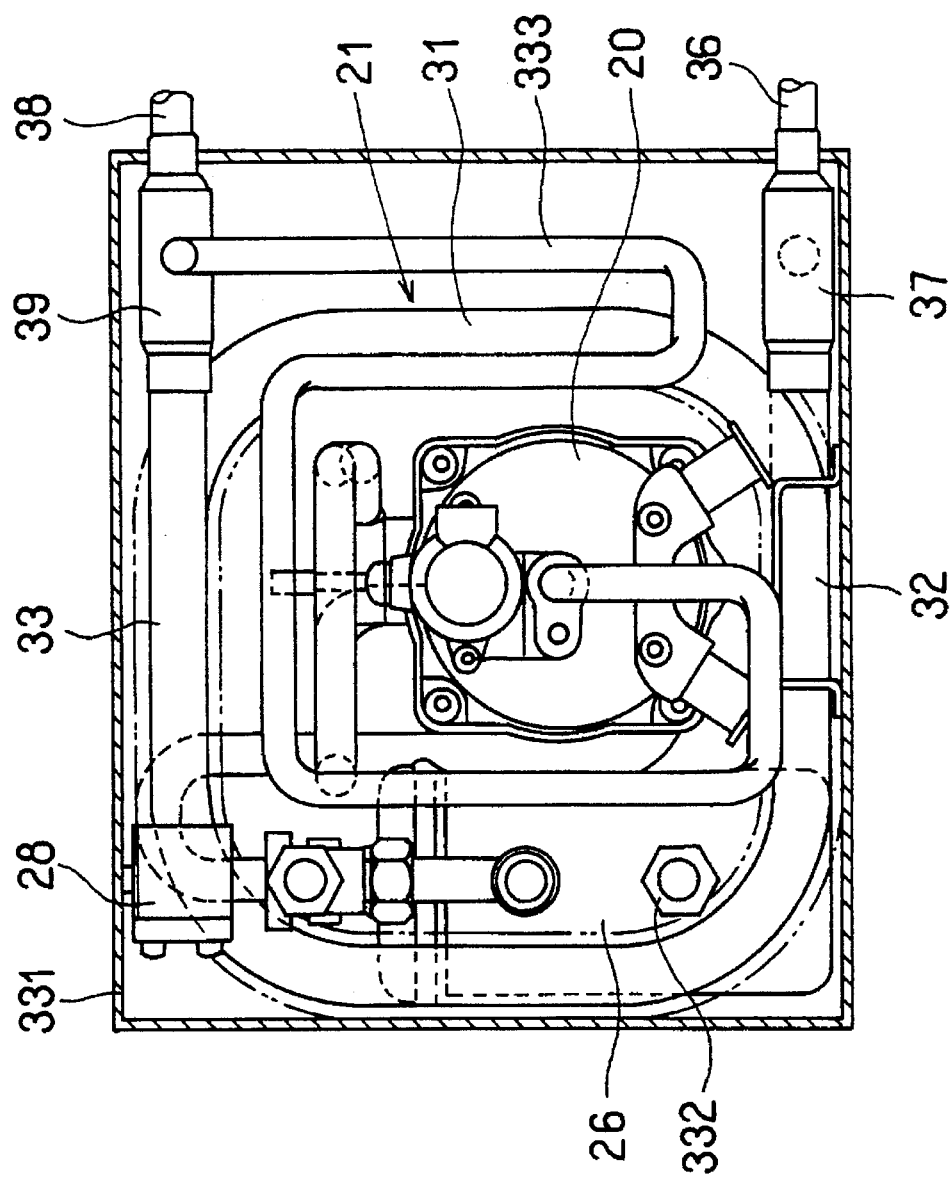
FIG. 23 is a side view showing refrigeration devices housed in an refrigeration device housing according to the tenth embodiment of the present invention.
Figure 24:
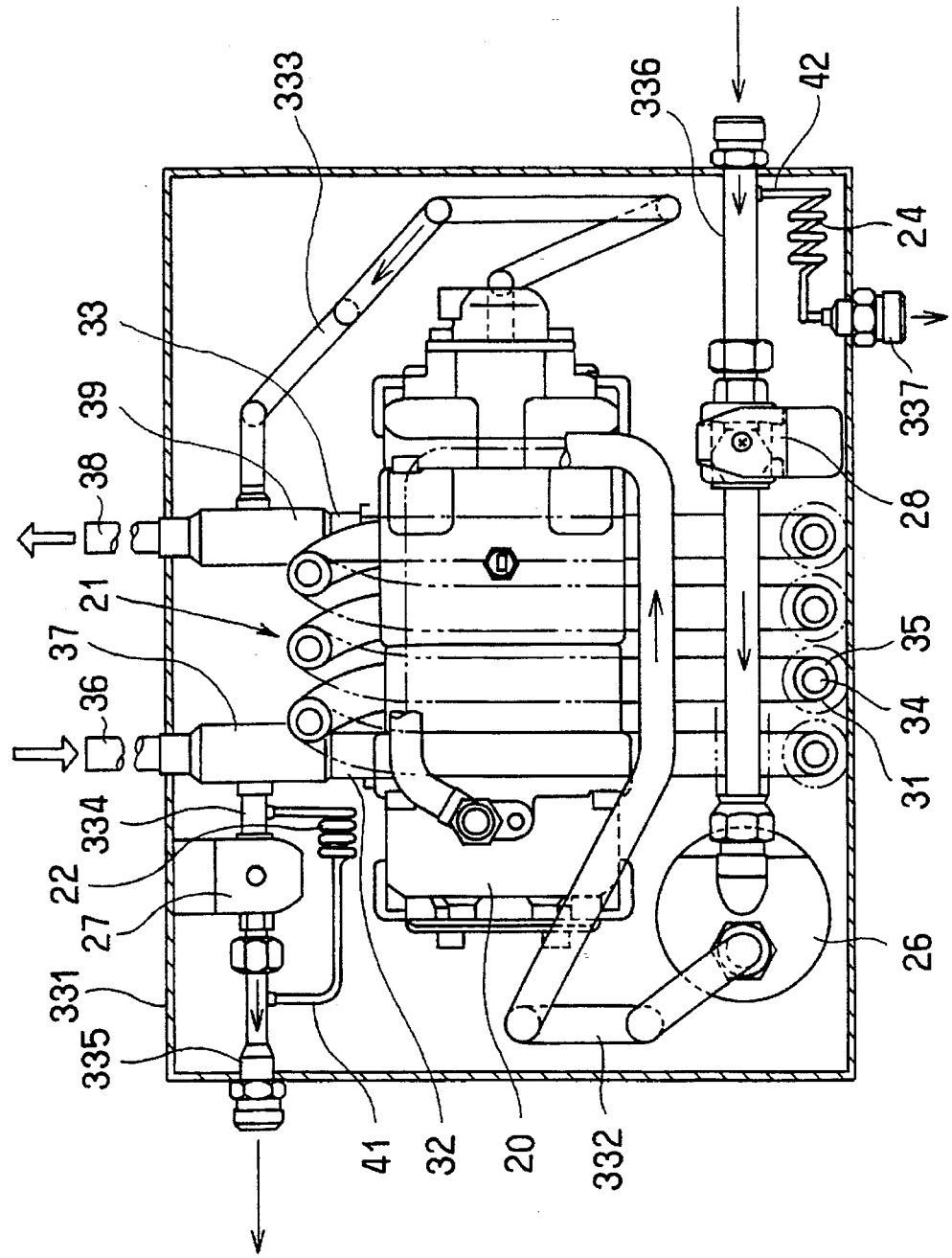
FIG. 24 is a plan view showing refrigeration devices housed in an refrigeration device housing according to the tenth embodiment of the present invention.

FIGS. 21 to 24 illustrate a tenth embodiment according to the present invention, and show an air-conditioning apparatus for electric automobile use. FIGS. 22–24 show a refrigeration device housing within an air-conditioning apparatus for electric automobile use. According to this embodiment, a refrigeration device of air-conditioning apparatus for electric automobile use 1 is housed within refrigeration device housing 331 in consideration of mounting same on an electric automobile.

Refrigeration device housing 331 according to this embodiment integrally houses refrigerant compressor 20, refrigerant/water heat exchanger 21, first and second pressure-reducing means (capillary tubes) 22 and 24, accumulator 26, refrigerant passage switching valves 27 and 28, and the like. The intake port of refrigerant compressor 20 is connected within refrigeration device housing 331 to the outlet of accumulator 26 by means of refrigerant piping of tubular configuration 332. Additionally, the discharge port of refrigerant compressor 20 is connected within refrigeration device housing 331 to inlet of refrigerant inlet pipe 39 interconnected to square pipe portion 33 of refrigerant/water heat exchanger 21 by means of refrigerant piping of tubular configuration 333.

As was also described according to the first embodiment, refrigerant/water heat exchanger 21 is composed of a circular pipe portion 31 having a double-loop configuration and two square pipe portions 32 and 33, with hot-water path 34 formed on the inner side and refrigerant path 35 formed on the outer side thereof. Accordingly, an outlet of refrigerant outlet pipe 37 linked to square pipe portion 32 of refrigerant/water heat exchanger 21 is connected within refrigeration device housing 331 to the inlet of first pressure-reducing means 22 and the inlet of refrigerant passage switching valve 27 (inlet of bypass pipeline 41) by means of refrigerant piping of tubular configuration 334.

Furthermore, hot-water inlet pipe 36 linked to square pipe portion 32 of refrigerant/water heat exchanger 21 enters the interior of refrigeration device housing 331, and is connected to an outlet of bypass passage 67 of hot-water cycle 5 (in the case wherein hot-water heat-radiating path 65 is provided, the hot-water heat-radiating path 65). Additionally, an outlet of hot-water outlet pipe 38 linked to square pipe portion 33 of refrigerant/water heat exchanger 21 exits from the interior of refrigeration device housing 331 and is connected to an inlet of hot-water heater core 52.

Outlet of refrigerant piping of tubular configuration 335 linked to the outlet of first pressure-reducing means 22 and the outlet of refrigerant passage switching valve 27 exits refrigeration device housing 331 and is connected to an inlet of exterior heat exchanger 23. An outlet of refrigerant piping of tubular configuration 336 linked to the inlet of second pressure-reducing means 24 and the inlet of refrigerant passage switching valve 28 enters the interior of refrigeration device housing 331. The inlet of refrigerant piping 336 is connected to the outlet of exterior heat exchanger 23, and the outlet of refrigeration piping 336 is connected to the inlet of accumulator 26 within refrigeration device housing 331. Moreover, the outlet of second pressure-reducing means 24 is connected to refrigerant piping of tubular configuration 337, exiting from refrigeration device housing 331, and is connected to an inlet of refrigerant evaporator 25.

Furthermore, according to this embodiment it is acceptable to house inverter for air conditioner use 30 within refrigeration device housing 331, or it is acceptable to house only refrigerant compressor 20 and refrigerant/water heat exchanger 21 within refrigeration device housing 331. This combination of refrigeration devices housed integrally within refrigeration device housing 331 may be refrigerant compressor 20 and peripheral devices thereof or refrigerant/water heat exchanger 21 and peripheral devices thereof, as desired.

In the above-described manner, air-conditioning apparatus for electric automobile use 1 according to this embodiment integrally houses refrigeration devices forming refrigeration cycle 4 other than exterior heat exchanger 23 and refrigerant evaporator 25 within refrigeration device housing 331, and so mounting on an electric automobile is made greatly easier, and along with this, because arrangement of refrigeration piping 332–335 becomes unnecessary along with the completion of the disposal of refrigeration cycle 20, refrigerant/water heat exchanger 21, first and second pressure-reducing means 22 and 24, accumulator 26, refrigerant passage switching valves 27 and 27, and the like simply by disposing refrigerant piping of tubular configuration 331 with an engine compartment of an electric automobile. The assembly productivity for an electric automobile is excellent, and reduction of production cost is accomplished.

[The Eleventh Embodiment]

Figure 25:
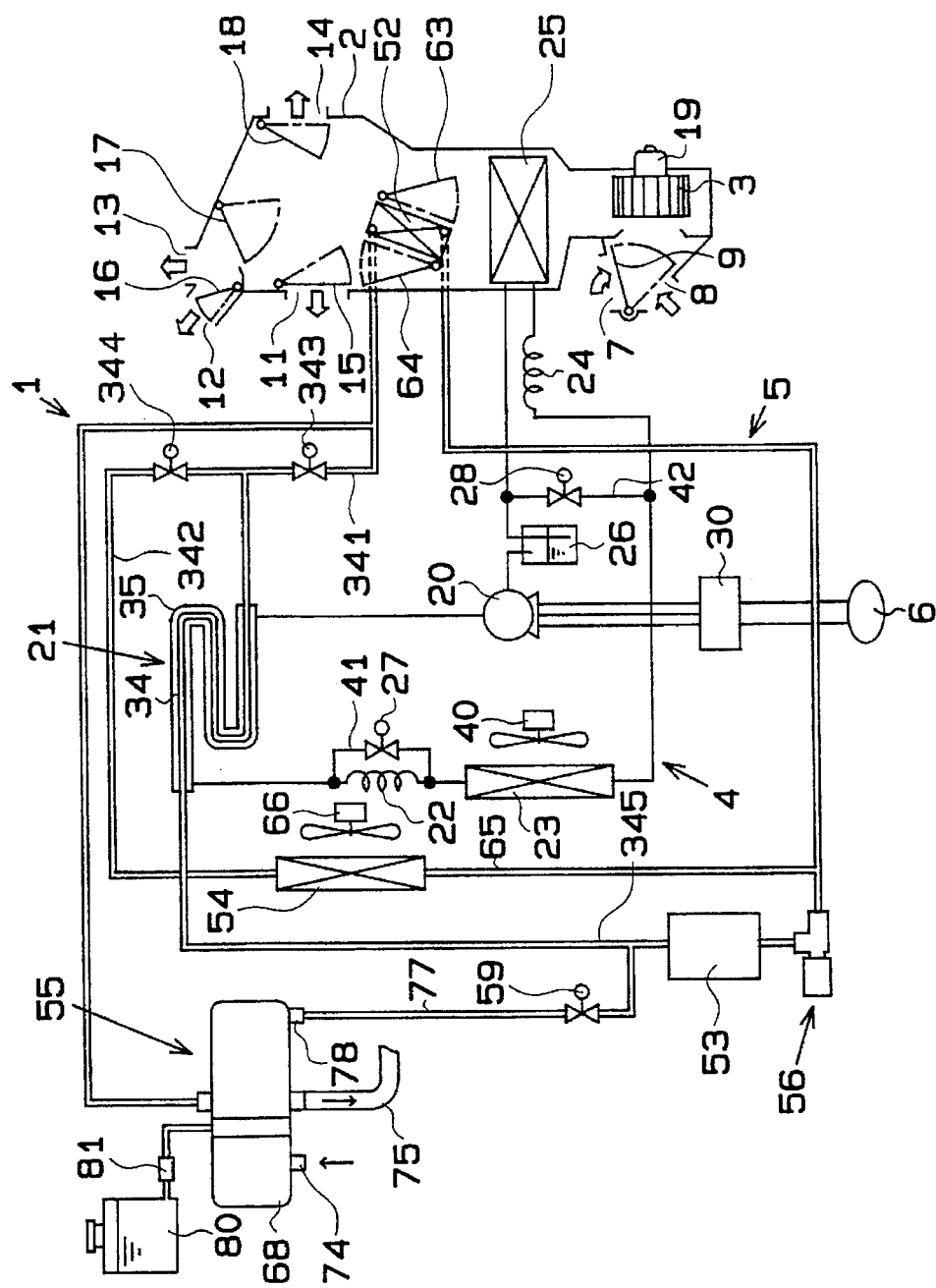
FIG. 25 is a structural view showing an eleventh embodiment of the present invention.

FIG. 25 illustrates an eleventh embodiment according to the present invention, and shows an air-conditioning apparatus for electric automobile use. According to this embodiment, hot-water cycle 5 connects hot-water passage for heater use 341 and hot-water heat-radiating path 342 to an outlet of hot-water passage 34 of refrigerant/water heat exchanger 21.

Hot-water passage for heater use 341 is a passage that passes through hot-water heater core 52 and returns hot water to an inlet of water pump 56, and hot-water passage switching valve 343 is installed on the branch side. Additionally, hot-water heat-radiating path 65 is a passage that passes through radiator 54 and returns hot water to inlet of water pump 56, and hot-water passage switching valve 343 is installed on the branch side. Moreover, hot-water passage switching valves 343 and 344 are of the electromagnetic type hot-water passage switching means to switch the direction of hot-water flow within hot-water cycle 5, and are opened when electrically charged and closed when the electrical charging is stopped. Accordingly, exhaust-heat cooler 53 employed according to the first embodiment is connected between a branch point of combustion type heater passage 77 and refrigerant/water heat exchange passage 345 and the outlet of water pump 56.

According to this embodiment, by means of opening hot-water passage switching valve 343 and closing hot-water passage switching valve 344 during the heat-pump hot-water heater mode, exhaust heat of vehicle-mounted electrical devices is recovered during passage through exhaust-heat cooler 53 and hot water heated by means of refrigerant during passage through refrigerant/water heat exchanger 21 is supplied to hot-water heater core 52, and heating of the passenger compartment of the electric automobile is performed. Additionally, by means of closing hot-water passage switching valve 343 and opening hot-water passage switching valve 344 during the cooler mode, the supply of hot water to hot-water heater core 52 is stopped, and vehicle-mounted electrical devices such as motor for travel use M and inverter for travel use I at exhaust-heat cooler 53 are cooled by means of cooling hot water at radiator 54. Moreover, because hot water flowing into refrigerant/water heat exchanger 21 is cooled by radiator 54 and becomes low-temperature hot water and refrigerant/water heat exchanger 21 also functions as a refrigerant condenser, cooler performance is also improved.

[The Twelfth Embodiment]

Figure 26:
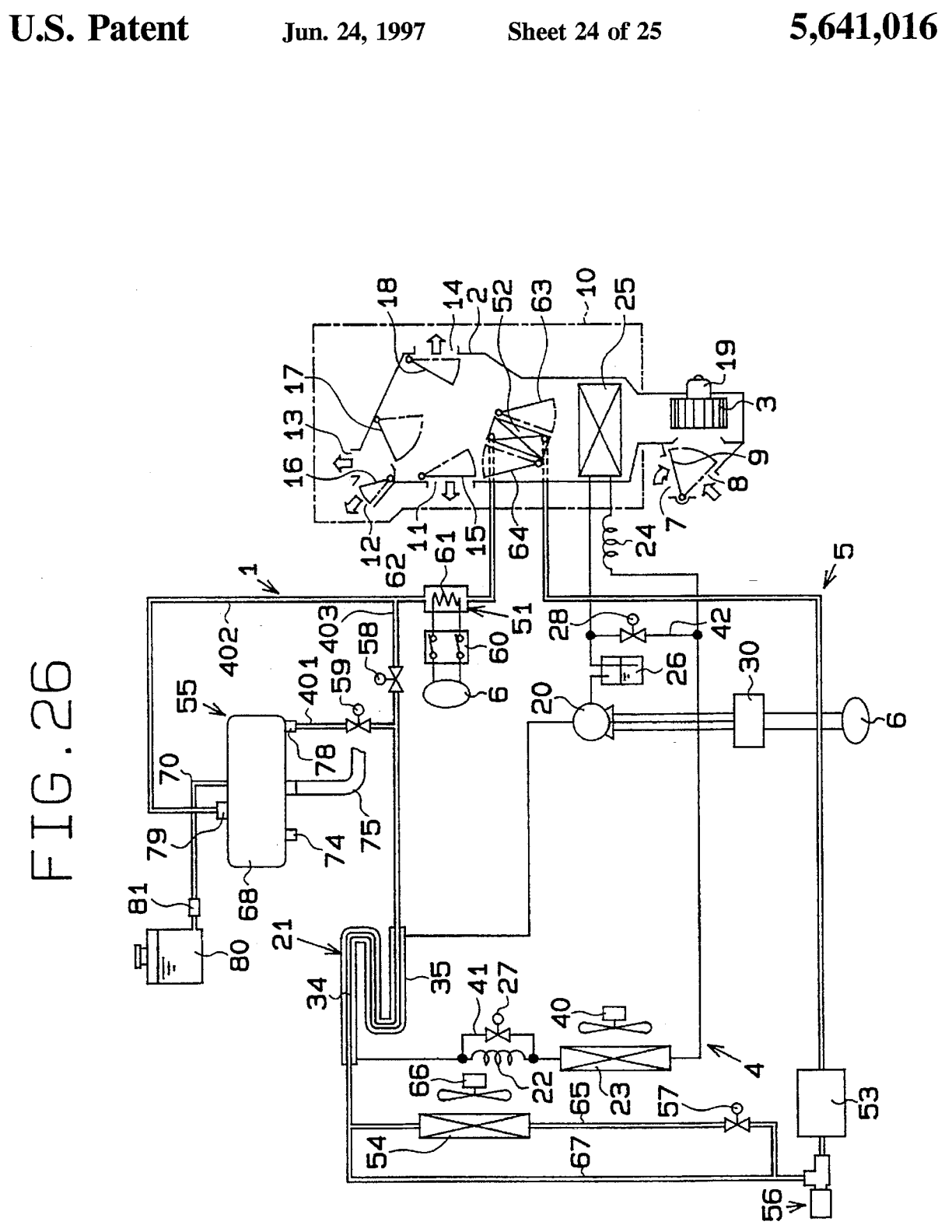

FIG. 26 illustrates a twelfth embodiment according to the present invention, and shows an air-conditioning apparatus for electric automobile use. In combustion type heater 55 according to this embodiment, intake port 78 is connected to branch passage 401 which branches on the downstream side of an outlet of hot-water passage 34 of refrigerant/water heat exchanger 21. Additionally, discharge port 79 of combustion type heater 55 is connected to union passage 402 uniting on the upstream side of an inlet of electric hot-water heater 51. Accordingly, bypass passage 403, which causes hot water flowing in from the outlet of hot-water passage 34 of refrigerant/water heat exchanger 21 to bypass from combustion type heater 55 and supplies it to hot-water heater core (hot-water type heater) 52, is connected to hot-water cycle 5.

Accordingly, hot-water passage switching valve 59 is provided in branch passage 401, and hot-water passage switching valve 58 is provided in bypass passage 403. Hot-water passage switching valve 58 is an electromagnetic valve that bypasses hot water and the supply of hot water from combustion type heater 55 by means of performing opening and closing of bypass passage 403. Additionally, hot-water passage switching valve 59 performs the supply of hot water and the interruption of hot water to combustion type heater 55 by means of performing opening and closing of branch passage 401.

Next, the mode of operation of an air-conditioning apparatus for electric automobile use 1 according to the twelfth embodiment will be described briefly with reference to FIG. 26. Herein, the heater operation mode according to this embodiment comprises a heat-pump independent operation mode and a simultaneous combustion heater and heat-pump operation mode.

During the heat-pump independent operation mode, in refrigeration cycle 4 the refrigerant passage switching valve 27 is closed and the refrigerant passage switching valve 28 is opened. Consequently, refrigerant discharged from the discharge port of refrigerant compressor 20 passes through refrigerant/water heat exchanger 21, through first pressure-reducing means 22, through exterior heat exchanger 23, through bypass pipeline 42, and through accumulator 26, and is taken into the intake port of refrigerant compressor 20.

Meanwhile, in hot-water cycle 5, hot-water passage switching valves 57 and 59 are closed and hot-water passage switching valve 58 is open. Consequently, hot water which passes through bypass passage 67 and flows into the refrigerant/water heat exchanger 21 by means of operating water pump 56 is heated by means of condensation heat of the refrigerant. This heated hot water flows into hot-water heater core 52 within duct 2 and exchanges heat with air blown by means of operation of blower 3, and the air becomes hot air. This hot air is blown into the passenger compartment primarily from the FOOT vent 14, by means of which the passenger compartment is heated.

Depending on the destination region, when there is need to improve heater startup in a cold-climate region where ambient temperature is extremely low (for example −10° C. or less), it is necessary to simultaneously perform heat-pump hot-water heating by means of refrigeration cycle 4 and combustion heater hot-water heating by means of combustion type heater 55. At such time as this, in the refrigeration cycle, refrigerant passage switching valve 27 is closed and refrigerant passage switching valve 28 is open, and by means of operating refrigerant compressor 20, refrigerant discharged from the discharge port of refrigerant compressor 20 passes through refrigerant/water heat exchanger 21, through first pressure-reducing means 22, through exterior heat exchanger 23, through bypass pipeline 42, and through accumulator 26, and enters the intake port of refrigerant compressor 20.

Meanwhile, in hot-water cycle 5, hot-water passage switching valves 57 and 59 are closed and the hot-water passage switching valve 58 is open. Consequently, hot water which passes through bypass passage 67 and flows into refrigerant/water heat exchanger 21 by means of operating water pump 56 is heated by means of condensation heat of the refrigerant. This heated hot water flows through branch passage 401 and is further heated within combustion type heater 55, flows through union passage 402 and into hot-water heater core 52 within duct 2, exchanges heat with air blown by means of operation of blower 3, and the air becomes hot air. This hot air is blown into the passenger compartment primarily from the FOOT vent 14, by means of which the passenger compartment is heated.

Here, in a case wherein heat-pump hot-water heating by means of refrigeration cycle 4 and combustion heater hot-water heating by means of combustion type heater 55 are performed simultaneously, if refrigeration cycle (heat pump) 4 attempts to obtain high-temperature hot water, refrigerant compressor 20 discharge pressure (equal to the refrigerant/water heat exchanger 21 condensation pressure) rises, the amount of work of refrigerant compressor 20 increases and liquefies, and there is a spontaneous upper limit. For example, in order to obtain a water temperature of 60° C. proximate to the outlet of hot-water passage 34 of refrigerant/water heat exchanger 21, it is necessary to restrain the discharge pressure of the refrigerant compressor 20 to 25 kg/cm$^2$ G when used with R134a freon-base refrigerant or to about 38 kg/cm$^2$ G when used with R22 freon-base refrigerant.

Additionally, in heat-pump hot-water heating by means of refrigeration cycle 4, from the standpoint of heater efficiency there is a problem of greater deterioration of efficiency (COP) the more it is attempted to obtain hot water of higher temperature even at identical capacity, but in combustion type heater 55 there is no such problem. However, the specification range is restricted to a hot-water upper-limit temperature of 100° C. or less (for example (90° C.) so as not to cause the hot water to boil.

According to this embodiment as described above, during the simultaneous combustion heater and heat-pump operation mode, it is preferable that, after the temperature of hot water is raised to for example about 40° C. to 50° C. at refrigerant/water heat exchanger 21 by means of heater operation of refrigeration cycle 4, the temperature may be further raised to proximate the hot-water upper-limit temperature within combustion type heater 55.

Furthermore, it is also acceptable to eliminate electric hot-water heater 51, radiator 54, hot-water passage switching valve 57, and hot-water heat-radiating path 65 from hot-water cycle 5 according to this embodiment and simplify hot-water cycle 5. Additionally, a cooler mode and dehumidify mode can be performed according to this embodiment as well.

[The Thirteenth Embodiment]

Figure 27:
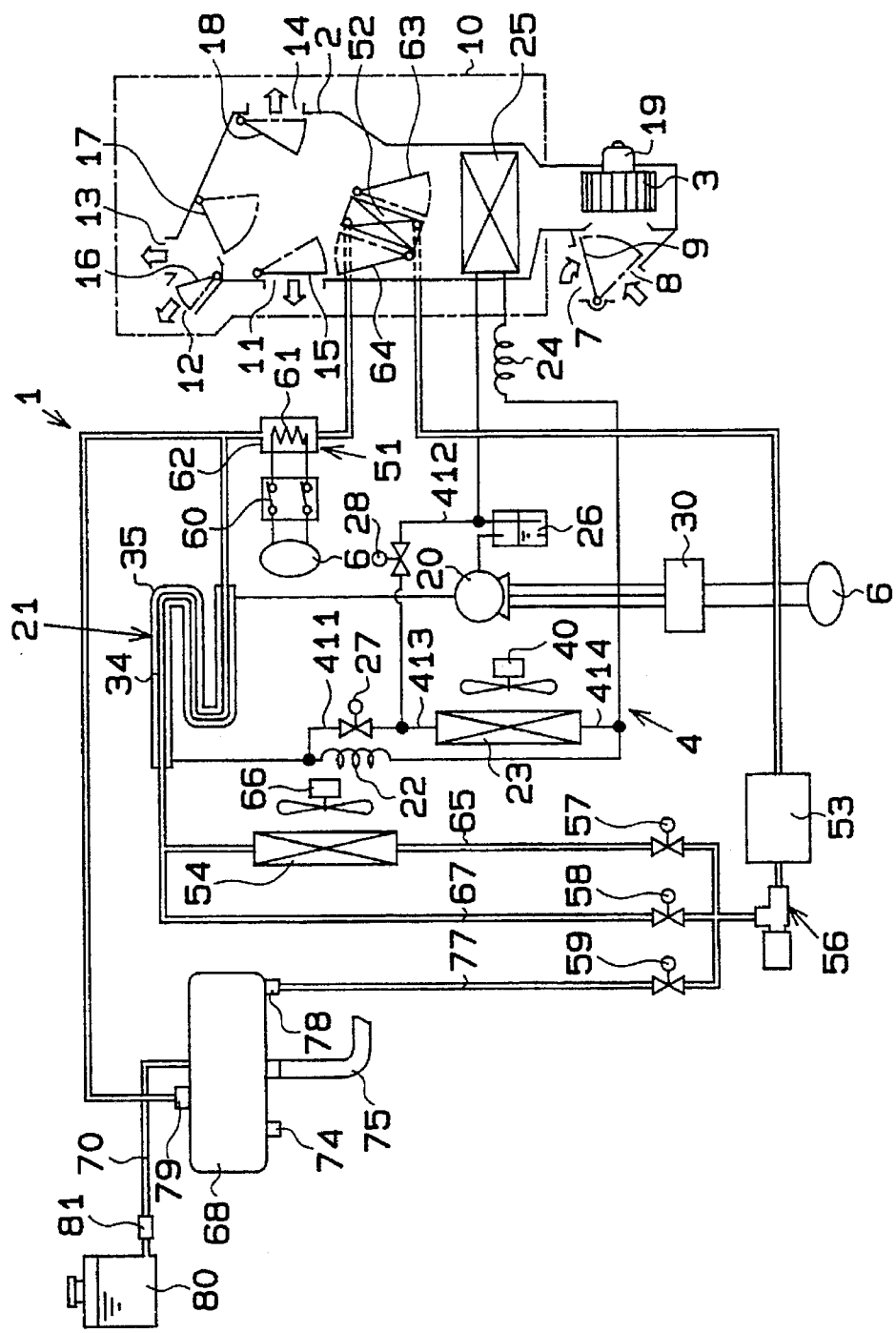
FIG. 27 is a structural view showing a thirteenth embodiment of the present invention.

FIG. 27 illustrates a thirteenth embodiment according to the present invention, and shows an air-conditioning apparatus for electric automobile use. Refrigeration cycle 4 according to this embodiment includes bypass pipeline 411 bypassing first pressure-reducing means 22, bypass pipeline 412 bypassing second pressure-reducing means 24 and refrigerant evaporator 25, refrigerant outlet/inlet passage 413 connecting exterior heat exchanger 23 and bypass passages 411 and 412 in series, refrigerant outlet/inlet passage 414 connecting exterior heat exchanger 23 and first and second pressure-reducing means in series.

Refrigerant passage switching valve (electromagnetic valve) 27 which opens during a cooler mode and during a dehumidify mode is provided in bypass passage 411, and refrigerant passage switching valve (electromagnetic valve) 28 which opens during a heat-pump hot-water heater mode is provided in bypass passage 412.

During the heater mode and during the dehumidify mode, exterior heat exchanger 23 functions as a condenser to cause refrigerant flowing in from refrigerant/water heat exchanger 21 via refrigerant outlet/inlet passage 413 and outer air blown by means of electric fan 40 to exchange heat and cause the refrigerant to condense. Additionally, during the heat-pump hot-water heater mode, exterior heat exchanger 23 functions as an evaporator causing refrigerant flowing in from second pressure-reducing means 24 via refrigerant outlet/inlet passage 414 and outer air blown by means of electric fan 40 to exchange heat and cause the refrigerant to evaporate.

Next, a mode of operation of air-conditioning apparatus for electric automobile use 1 according to the thirteenth embodiment will be described briefly with reference to FIG. 27.

During the cooler mode (cooler operation), in refrigeration cycle 4, refrigerant passage switching valve 27 is opened and refrigerant passage switching valve 28 is closed. Consequently, refrigerant discharged from the discharge port of refrigerant compressor 20 passes through refrigerant/water heat exchanger 21, through refrigerant outlet/inlet passage 413, through exterior heat exchanger 23, through refrigerant outlet/inlet passage 414, through second pressure-reducing means 24, through refrigerant evaporator 25, and through accumulator 26, and is then taken into the intake port of refrigerant compressor 20. Accordingly, air cooled by the heat of vaporization of refrigerant in refrigerant evaporator 25 is blown into the passenger compartment, by means of which the passenger compartment is cooled.

In the dehumidify mode, in the same manner as for the cooler mode, refrigerant passage switching valve 27 is opened and refrigerant passage switching valve 28 is closed. By means of this, air blown into refrigerant evaporator 25 by means of operation of blower 3 is cooled. Accordingly, moisture in the air is condensed and adheres to the fins or the like of refrigerant evaporator 25, by means of which the air is dehumidified. Moreover, in a case where reheating of dehumidified air is desired, as in the first embodiment, it is acceptable to cause air-mix dampers 63 and 64 to operate, lead a portion or all of the air into hot-water heater core 62, and cause heat exchange with the hot water.

During the heat-pump hot-water heater mode (heater operation), in refrigeration cycle 4, refrigerant passage switching valve 27 is closed and refrigerant passage switching valve 28 is opened. Consequently, refrigerant discharged from the discharge port of refrigerant compressor 20 passes through refrigerant/water heat exchanger 21, through first pressure-reducing means 22, through refrigerant outlet/inlet passage 414, through exterior heat exchanger 23, through refrigerant outlet/inlet passage 413, through bypass pipeline 412, and through accumulator 26, and is then returned to the intake port of refrigerant compressor 20.

Meanwhile, in hot-water cycle 5, hot-water passage switching valves 57 and 59 are closed and hot-water passage switching valves 58 is opened. Consequently, hot water which passes through bypass passage 67 and flows into refrigerant/water heat exchanger 21 by means of operating water pump 56 is heated by means of condensation heat of the refrigerant. This heated hot water flows into hot-water heater core 52 within duct 2 and exchanges heat with air blown by means of operation of blower 3, and the air becomes hot air. This hot air is blown into the passenger compartment primarily from FOOT vent 14, by means of which the passenger compartment is heated.

According to this embodiment, first and second pressure-reducing means 22 and 24, refrigerant passage switching valves 27 and 28, and bypass pipelines 411 and 412 are connected such that during the cooler mode (cooler operation) refrigerant flows from refrigerant outlet/inlet passage 413, to exterior heat exchanger 23, and to refrigerant outlet/inlet passage 414, and such that during the heat-pump hot-water heater mode (heater operation) refrigerant flows from refrigerant outlet/inlet passage 414, to exterior heat exchanger 23, and to refrigerant outlet/inlet passage 413.

By means of this, the gas side of exterior heat exchanger 23 becomes refrigerant outlet/inlet passage 413, and the liquid side of exterior heat exchanger 23 becomes refrigerant outlet/inlet passage 414. That is to say, during the cooler mode (cooler operation) which causes exterior heat exchanger 23 to function as a condenser and during the heat-pump hot-water heater mode (heater operation) which causes exterior heat exchanger 23 to function as an evaporator the direction of flow of refrigerant can be reversed. Consequently, the path cross-section area of the refrigerant path of exterior heat exchanger 23 can be changed from larger to smaller according to movement from the gas side to the liquid side, and so pressure loss of refrigerant flow and heat-exchange performance of exterior heat exchanger 23 can be established without difficulty.

[Modification]

Even in a case where there is restriction in usage (for example restriction that a combustion type heater must not be used unless ambient temperature drops below a prescribed value), from the standpoint of environmental concern in a combustion type heater or the like which is a heat source for heater use in cold-climates, in an air conditioning system according to the first, third, or sixth embodiments a hot-water passage can be formed without using combustion type heater 55 by means of switching a passage of hot water with hot-water passage switching valves 57 to 59, and thus, conforming with the above-described restriction is possible.

According to this embodiment, the present invention is used in an air-conditioning apparatus for electric automobile use, but it is also possible to use the present invention in an air-conditioning apparatus for use in a vehicle having an air-cooled type engine or a water-cooled type engine. Moreover, it is also possible to utilize distilled water, an aqueous solution to which is added corrosion-prevention additives for preventing corrosion of various metals, long-life coolant, or the like, instead of the hot water.

According to this embodiment, refrigerant passage switching valves 27 and 28 are provided as refrigerant passage switching means, but it is also acceptable to provide a three-way valve or a four-way valve as refrigerant passage switching means. According to this embodiment, hot-water passage switching valves 57 to 59 are provided as hot-water passage switching means, but it is also acceptable to provide a three-way valve or a four-way valve as hot-water passage switching means.

According to this embodiment, combustion type heater 55 is utilized as a heat source for heater use in cold-climates, but it is also acceptable to utilize only electric hot-water heater 51 with a built-in electric heater as a heat source for heater use in cold-climate region specifications. Additionally, it is also acceptable to adjust the blowing temperature of air blown into the passenger compartment by means of adjusting the circulating amount of hot water with water pump 56, a flow control valve, or the like.

According to this embodiment, exhaust-heat cooler 53 is connected to hot-water piping connecting hot-water heater core 52 and water pump 56, but it is also acceptable to connect to hot-water piping connecting refrigerant/water heat exchanger 21 and hot-water heater core 52. Moreover, in this case, when hot water is overheated by an auxiliary heat source for heater use of vehicle-mounted electrical devices or the like, it is also acceptable to provide a bypass passage. Additionally, it is also acceptable to employ refrigerant compressor 20, inverter for air conditioner use 30, electric fan 40, cooling fan 60, or the like as a vehicle-mounted electrical device to recover exhaust heat at exhaust-heat cooler 53.

The present invention can provide a large quantity of heat to air blown into a passenger compartment by means of a heat-pump heater operating an exterior heat exchanger disposed within a duct as a compressor, and so heating capacity in a passenger compartment can be improved. Additionally, because an existing heater unit provided with a hot-water type heater can be utilized, newly provided components can be reduced, and lower cost can be achieved.

Furthermore, the present invention can provide air blown into a passenger compartment with a large quantity of heat than a heat-pump hot-water heater and so sufficient heater capacity can be obtained even in a cold-climate region. Moreover, because a hot-water cycle having a refrigerant/water heat exchanger, hot-water type heater, and water pump is mounted in a vehicle, a combustion type heater can be combined in the hot-water cycle with an extremely simple assembly operation, and so lower cost can be achieved.

During heat-pump hot-water heating of in the present invention, the invention can effectively utilize a vehicle-mounted electrical device, being a motor for travel use, an inverter for travel use, or the like as an auxiliary heat source.

This invention has been described in connection with what are presently considered to be the most practical and preferred embodiments of the present invention. However, this disclosure is not meant to be limited to the disclosed embodiments, but rather is intended to cover all modifications and equivalent arrangements included within the spirit and scope of the appended claims.

What is claimed is:

1. An air-conditioning apparatus for use in a vehicle having a passenger compartment, said air-conditioning apparatus comprising:
   a duct for leading air toward said passenger compartment;
   a blower for moving air within said duct to said passenger compartment;
   a refrigeration cycle including a refrigerant compressor for compressing and discharging refrigerant, a refrigerant/water heat exchanger for exchanging heat between refrigerant discharged from said refrigerant compressor and hot water in order to heat said hot water, and a refrigerant evaporator for cooling air by means of refrigerant evaporation heat; and
   a hot-water cycle including a pump for circulating said hot water heated by said refrigerant/water heat exchanger, and a hot-water type heater disposed within said duct for heating air flowing within said duct by means of hot water entering said hot-water type heater from said refrigerant/water heat exchanger.

2. An air-conditioning apparatus for use in a vehicle according to claim 1, wherein said refrigeration cycle includes an exterior heat exchanger disposed outside said air duct and connected in series with and on a downstream side of said refrigerant compressor as determined by a direction of refrigerant flow from said refrigeration compressor.

3. An air-conditioning apparatus for use in a vehicle according to claim 1, wherein said hot-water cycle includes a radiator for exchanging heat between air outside said passenger compartment and said hot water to cool said hot water connected in series with an exhaust-heat cooler for cooling, by means of hot water, vehicle-mounted electrical devices which generate heat when electrically charged.

4. An air-conditioning apparatus for use in a vehicle according to claim 3, wherein said vehicle-mounted electrical devices include a motor used when said vehicle travels and an inverter also used when said vehicle travels, said inverter including transistors that generate heat when electrically charged.

5. An air-conditioning apparatus for use in a vehicle according to claim 1, wherein said hot-water cycle includes a combustion type heater for heating hot water via combustion of fuel connected in series with said hot-water type heater.

6. An air-conditioning apparatus for use in a vehicle according to claim 2, further comprising a pressure-reducing means connected between said refrigerant/water heat exchanger and said exterior heat exchanger.

7. An air-conditioning apparatus for use in a vehicle according to claim 1 wherein said hot-water cycle includes an exhaust-heat cooler for cooling via hot water, vehicle-mounted electrical devices, which generate heat when electrically charged, connected in series with said hot-water type heat exchanger.

8. An air-conditioning apparatus for use in a vehicle according to claim 7, wherein said vehicle-mounted electrical devices include a motor used when said vehicle travels and an inverter also used when said vehicle travels, said inverter including transistors that generate heat when electrically charged.

9. An air-conditioning apparatus for use in a vehicle according to claim 1, wherein said hot-water cycle includes an electrical hot-water heater for heating hot water using an electrical heater connected in series with said hot-water type heater.

10. An air-conditioning apparatus for use in a vehicle according to claim 1, wherein said refrigeration cycle positions said refrigerant evaporator on an upwind side of said hot-water type heater within said duct.

11. An air-conditioning apparatus for use in a vehicle according to claim 1, further comprising a rotational speed control means for controlling rotational speed of said refrigerant compressor in order to perform capacity control.

12. An air-conditioning apparatus for use in a vehicle according to claim 3, wherein said hot-water cycle further includes a bypass passage for allowing hot water to bypass said radiator.

13. An air-conditioning apparatus for use in a vehicle according to claim 1, wherein said hot-water type heater includes an air-mix damper for changing the amount of air heated in said duct.

14. An air-conditioning apparatus for use in a vehicle according to claim 1, wherein said refrigeration cycle includes an exterior heat exchanger disposed outside said duct and connected in series with and on a downstream side of said refrigeration compressor as determined by a direction of refrigerant flow from said refrigeration compressor, and a pressure-reducing means connected between said refrigerant/water heat exchanger and said exterior heat exchanger;

wherein said hot-water cycle includes a combustion type heater for heating hot water via combustion of fuel connected in series with said hot-water type heater; and wherein said air-conditioning apparatus includes a heat-pump hot-water heater and a combustion-heater hot-water heater as said combustion type heater, and said heat-pump hot-water heater and said combustion-heater hot water heater are selectively utilized based on a temperature of air outside said passenger compartment.

15. An air-conditioning apparatus for use in a vehicle according to claim 1, further comprising a water-cooled type internal combustion engine having a water-cooling portion within which water circulates; and an electrical generator driven by rotation of said water-cooled type internal combustion engine;

wherein said refrigerant compressor is an electromotive type refrigerant compressor which receives a supply of electrical power from said electrical generator in order to operate; and wherein said hot-water cycle includes said water-cooling portion connected in series with and on a downstream side of said refrigerant/water heat exchanger as determined by a direction of water flow from said refrigerant/water heat exchanger.

16. An air-conditioning apparatus for use in a vehicle according to claim 1, further comprising a water-cooled type internal combustion engine having a water-cooling portion within which water circulates;

wherein said refrigerant compressor is driven by rotation of said water-cooled type internal combustion engine; and wherein said hot-water cycle includes said water-cooling portion connected in series with and on a downstream side of said refrigerant/water heat exchanger as determined by a direction of water flow from said refrigerant/water heat exchanger.

17. An air-conditioning apparatus for use in a vehicle according to claim 1, further comprising an inverter acting a drive power supply;

wherein said refrigerant compressor is an electromotive type refrigerant compressor controlled by said inverter; and wherein said hot-water cycle includes an exhaust-heat cooler for cooling said inverter via hot water connected in series with said hot-water type heater.

18. An air-conditioning apparatus for use in a vehicle according to claim 1, further comprising an integral casing housing at least said refrigerant compressor and said refrigerant/water heat exchanger.

19. An air-conditioning apparatus for use in a vehicle according to claim 5, wherein said combustion type heater is connected in series with and on a downstream side said refrigerant/water heat exchanger as determined by a direction of hot-water flow from said refrigerant/water heat exchanger;

wherein said combustion type heat exchanger is connected in series with and on an upstream side of said hot-water type heater as determined by a direction of hot-water flow from said hot-water type heater; and wherein said combustion type heat exchanger is operated simultaneously with said refrigerant compressor.

20. An air-conditioning apparatus for use in a vehicle according to claim 2, wherein said exterior heat exchanger functions as a condenser for condensing refrigerant during cooler operation and functions as an evaporator for evaporating refrigerant during heater operation; and wherein refrigerant flows in a first direction in said exterior heat exchanger during cooler operation and in a second direction opposite said first direction during heater operation.

21. An air-conditioning apparatus for use in a vehicle according to claim 1, wherein said vehicle is an electric vehicle.

22. An air-conditioning apparatus for use in a vehicle having a passenger compartment, said air-conditioning apparatus comprising:

a duct for leading air toward said passenger compartment;

a blower for moving air within said duct to said passenger compartment;

a first refrigeration cycle including a refrigerant compressor for compressing and discharging a first refrigerant, a heat exchanger for exchanging heat between said first refrigerant discharged from said refrigerant compressor and a second refrigerant in order to heat said first refrigerant water, and a refrigerant evaporator for cooling air by means of refrigerant evaporation heat; and a second refrigeration cycle including a pump for circulating said second refrigerant heated by said heat exchanger, and a heater disposed within said duct for heating air flowing within said duct by means of said second refrigerant entering said heater from said heat exchanger;

wherein said heat exchanger is disposed at a downstream of said compressor to lead said first refrigerant discharged from said compressor and elevated to a high degree thereinto, and disposed at a upstream of said heater to lead said second refrigerant which has a lower degree and is heat exchanged with said first refrigerant.

23. An air-conditioning apparatus for use in a vehicle according to claim 22, wherein said first and second refrigerants are freon gas and hot-water, respectively.

* * * * *